(12) United States Patent
Komiya et al.

(10) Patent No.: US 6,885,480 B2
(45) Date of Patent: Apr. 26, 2005

(54) LIGHT BEAM SCANNING APPARATUS AND IMAGE FORMING APPARATUS

(75) Inventors: Kenichi Komiya, Kawasaki (JP); Koji Tanimoto, Tagata-gun (JP); Daisuke Ishikawa, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/929,399

(22) Filed: Aug. 31, 2004

(65) Prior Publication Data

US 2005/0024697 A1 Feb. 3, 2005

Related U.S. Application Data

(63) Continuation of application No. 10/446,105, filed on May 28, 2003, now Pat. No. 6,791,722.

(51) Int. Cl.[7] .............................................. H04N 1/04
(52) U.S. Cl. ................ 358/481; 358/448; 358/510; 358/453; 250/234; 250/235; 347/235; 347/243; 347/244
(58) Field of Search .......................... 358/474, 475, 358/480, 481, 488, 453, 448, 505, 509, 510; 347/233, 234, 235, 248, 249, 243–244; 250/234, 235, 578.1

(56) References Cited

U.S. PATENT DOCUMENTS

| 4,445,126 | A | | 4/1984 | Tsukada |
| 4,860,049 | A | * | 8/1989 | Toshimitsu et al. ......... 399/184 |
| 4,933,549 | A | | 6/1990 | Fujioka et al. |
| 4,965,590 | A | | 10/1990 | Yamazaki |
| 5,006,705 | A | | 4/1991 | Saito et al. |
| 5,151,586 | A | | 9/1992 | Sato et al. |
| 5,202,774 | A | | 4/1993 | Ishimitsu |
| 5,465,165 | A | * | 11/1995 | Tanio et al. ................. 358/448 |
| 5,576,852 | A | | 11/1996 | Sawada et al. |
| 5,892,533 | A | | 4/1999 | Tanimoto et al. |
| 5,929,891 | A | | 7/1999 | Komiya et al. |
| 5,995,246 | A | | 11/1999 | Komiya et al. |
| 6,208,367 | B1 | | 3/2001 | Tanimoto et al. |
| 6,246,463 | B1 | | 6/2001 | Hamada et al. |
| 6,459,503 | B1 | | 10/2002 | Tsuji |
| 6,459,509 | B1 | | 10/2002 | Maciey et al. |
| 6,469,730 | B1 | | 10/2002 | Tanimoto |
| 6,744,037 | B1 | * | 6/2004 | Yoshikawa et al. ......... 250/234 |
| 2002/0043611 | A1 | * | 4/2002 | Yoshikawa et al. ...... 250/280.1 |
| 2003/0123109 | A1 | * | 7/2003 | Kuchii et al. ................ 358/509 |

FOREIGN PATENT DOCUMENTS

JP        11-202229 A        7/1999

* cited by examiner

*Primary Examiner*—Eugene H. Eickholt
(74) *Attorney, Agent, or Firm*—Foley & Lardner LLP

(57) ABSTRACT

A synchronizing circuit and a timing adjusting circuit set a position of an exposure area by beam scanning as an additional value of a first setting value set in dot unit corresponding to the scanning of a pixel clock period and a second setting value set in tap unit corresponding to the scanning of a period smaller than the pixel clock period. A CPU controls the synchronizing circuit and the timing adjusting circuit so that the exposed position becomes an objective position. The CPU changes the second setting value to a first predetermined value by increasing the first setting value by one dot, in the case that the additional value is increased to reach a first threshold. Further, the CPU changes the second setting value to a second predetermined value by decreasing the first setting value by one dot, in the case that the additional value of the synchronizing circuit and the timing adjusting circuit in which the first setting value is increased by one dot is decreased to reach a second threshold smaller than the first threshold.

3 Claims, 17 Drawing Sheets

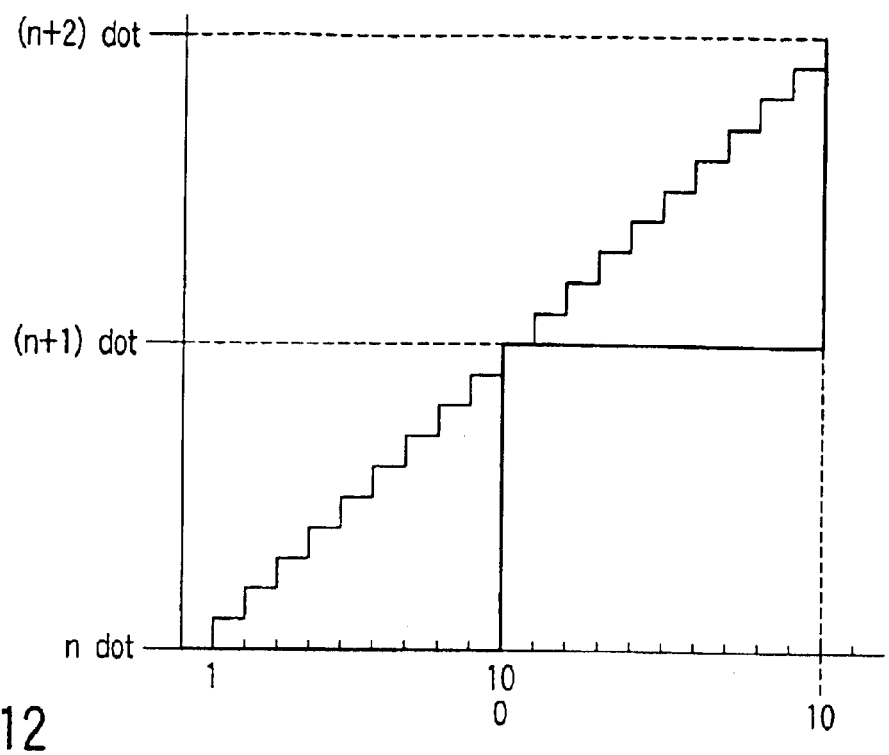
F I G. 12
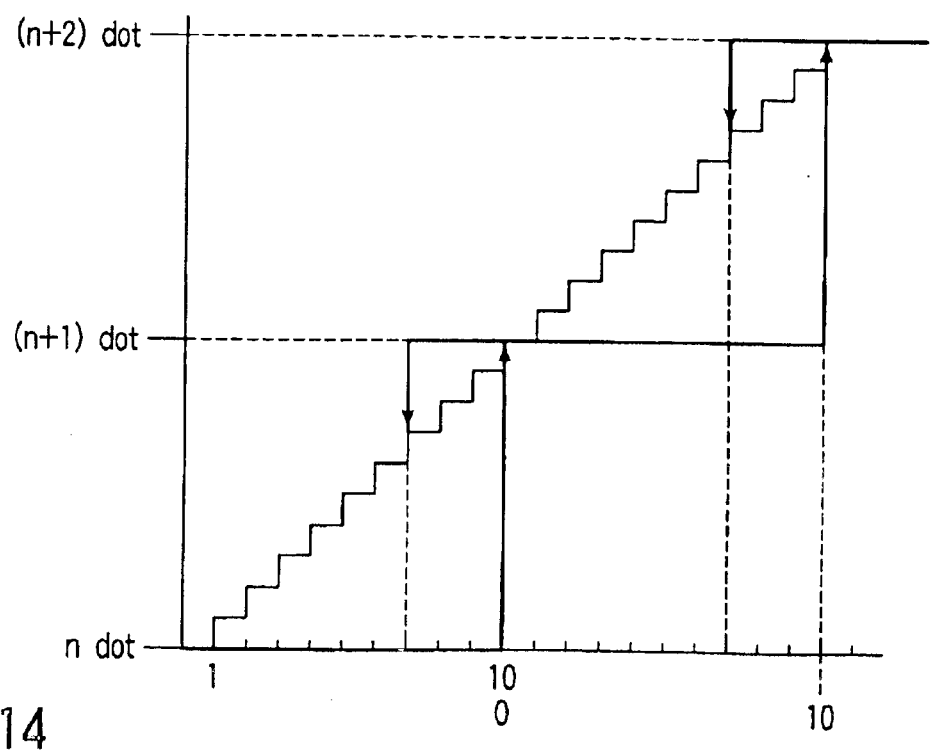
F I G. 14

LIGHT BEAM SCANNING APPARATUS AND IMAGE FORMING APPARATUS

The present application is a continuation of U.S. application Ser. No. 10/446,105, filed May 28, 2003 and now U.S. Pat. No. 6,791,722, the entire contents of which are incorporated herein by reference.

BACKGROUND OF THE INVENTION

The present invention relates to an image forming apparatus such as a digital copying machine, in which simultaneous scanning-exposure is performed onto a photoconductor drum with a plurality of laser beams to form an electrostatic latent image on the photoconductor drum during copy.

In recent years, various digital copying machines, which form an image by scanning-exposure with a laser beam and an electrophotographic process, have been developed. Recently, in order to realize high-speed image formation, a multi-beam type of digital copying machine, i.e. a digital copying machine in which a plurality of laser beams is generated and the simultaneous scanning-exposure is performed in a plurality of lines with the plurality of laser beams has been developed.

The multi-beam type of the digital copying machine includes a plurality of semiconductor laser oscillators which generates the laser beam, a galvanomirror which controls a position in a sub-scanning direction of each laser beam outputted from the plurality of semiconductor laser oscillators, a polygon mirror which scans the photoconductor drum with each laser beam by further reflecting each laser beam reflected by the galvanomirror toward the photoconductor drum, and a lens system unit which mainly includes a collimator lens and an f-θ lens.

In order to form an image at the accurate position on a paper, exposure points in a main scanning direction and a sub-scanning direction of each laser beam must be accurately adjusted in the case of the multi-beam type of digital copying machine. The adjustment of a beam scanning position is usually performed at the time of so-called a warming-up state when a power supply is turned on to initialize each portion of the apparatus, at the time of so-called a standby state when the warming-up is completed and the apparatus exists at the state in which the copy can be performed, and at the time immediately before a copy start button is pressed and the copy is started.

In the above-described multi-beam type of digital copying machine, the beam position in the sub-scanning direction and the beam exposure position in the main scanning direction are controlled for each laser beam, and a positional error of each laser beam is adjusted within several micronmeters. The adjustment of the beam position in the sub-scanning direction is performed by giving an indicated value to the galvanomirror until the error becomes not larger than tolerance. The adjustment of the beam exposure position in the main scanning direction is performed by using a pixel clock generating circuit and a delay circuit which delays the pixel clock in unit of a fraction of one pixel exposure time. Generally since it takes relatively long processing time to adjust the beam scanning position of the multi-beam type of digital copying machine, it is desired that the processing time of the adjustment is reduced.

BRIEF SUMMARY OF THE INVENTION

It is an object of the invention to reduce adjusting time of a beam exposure position in a main scanning direction and to comprehensively improve processing performance of a copy of an apparatus.

In order to achieve the above object, according to one aspect of the invention, there is provided a light beam scanning apparatus including a beam generating portion which generates a light beam, a scanning portion which reflects the light beam generated from the beam generating portion toward a scanned surface and exposes the scanned surface by scanning the scanned surface in a main scanning direction with the light beam, an exposure position setting portion setting a position of an exposure area by beam scanning of the scanning portion as an additional value of a first setting value which is set in a first unit corresponding to the scanning of a pixel clock period and a second setting value which is set in a second unit corresponding to the scanning of the period smaller than the pixel clock period, a first control portion which controls the beam generating portion and the scanning portion so as to expose the area set by the exposure position setting portion, a detecting portion which detects a position in the main scanning direction of the area exposed by the first control portion, and a second control portion including a first changing portion which changes the second setting value to a first predetermined value by increasing the first setting value by one unit in the case that the additional value of the exposure position setting portion is increased to reach a first threshold so that the exposure position detected by the detecting portion becomes an objective position, and a second changing portion which changes the second setting value to a second predetermined value by decreasing the first setting value by one unit in the case that the additional value of the exposure position setting portion in which the first setting value has been increased by one unit is decreased to reach a second threshold smaller than the first threshold, wherein the second threshold is separated from the first threshold by a distance corresponding to a value in which the first predetermined value is added to the value of the second unit corresponding to the scanning of the pixel clock period.

BRIEF DESCRIPTION OF THE SEVERAL VIEWS OF THE DRAWING

FIGS. 11A and 11B are views for illustrating main scanning control in the case that a beam emitting timing is changed by temperature change or the like;

FIG. 12 is a view for illustrating carry-up/carry-down of the dot and the tap;

FIG. 14 is a view for illustrating a principle of the carry-up/carry-down of the dot and the tap according to a first embodiment of the invention;

DETAILED DESCRIPTION OF THE INVENTION

Figure 1:
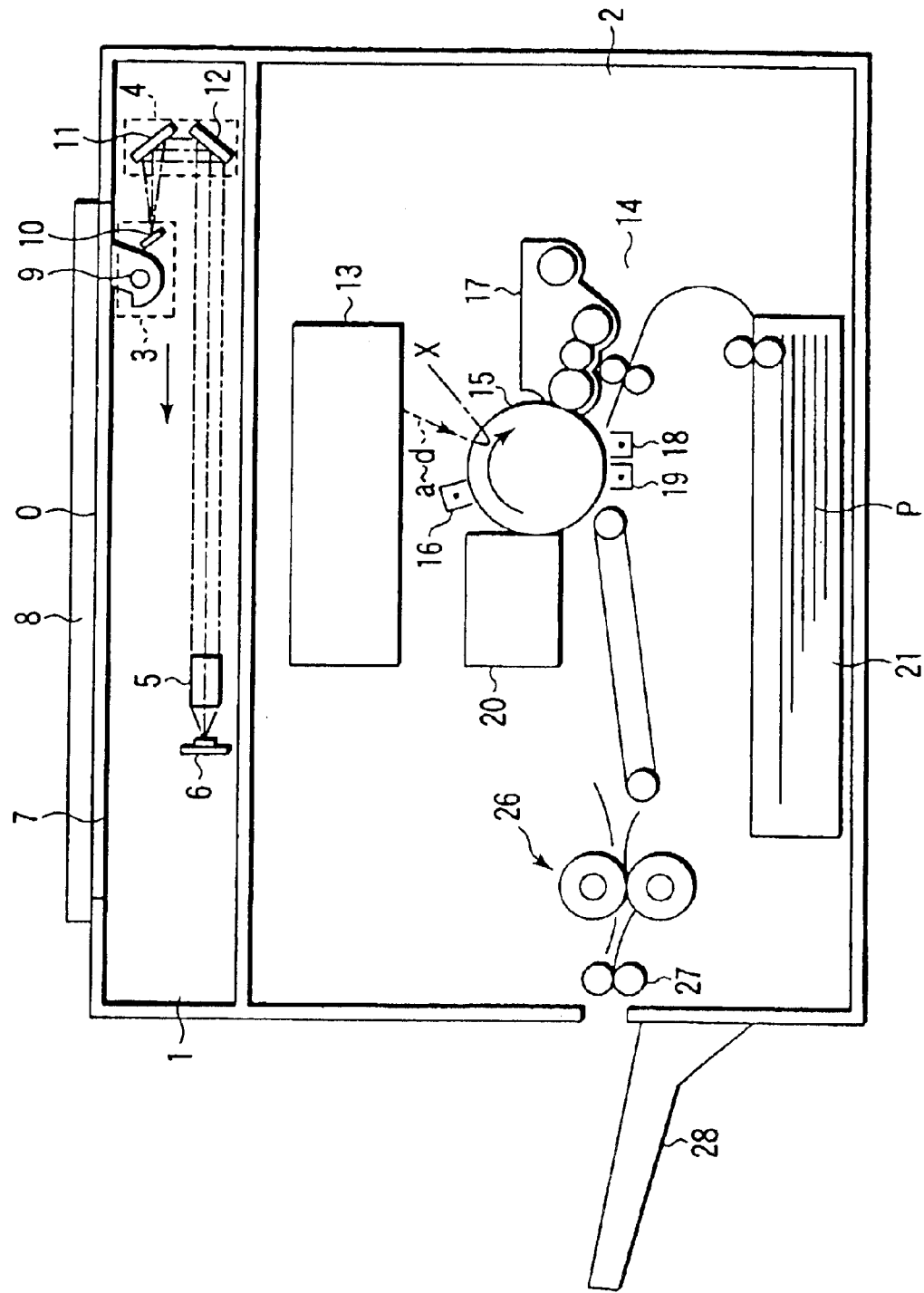
FIG. 1 is a block diagram showing a structure of a digital copying machine as an image forming apparatus according to a first embodiment of the invention.

FIG. 1 is a block diagram showing a structure of a digital copying machine as an image forming apparatus according to a first embodiment of the invention. The digital copying machine includes a scanner portion 1 as image reading means and a printer portion 2 as image forming means.

The scanner portion 1 includes a first carriage 3 and a second carriage 4 which are movable in a direction of an arrow shown in FIG. 1, a focusing lens 5, and a photoelectric conversion element 6. An original O is placed downward on an original placement plate 7 made of transparent glass, and a right side of a front in the direction of a smaller side of the original placement plate 7 is set to a center reference in a placing reference of the original O. The original O is pressed on the original placement plate 7 with an original fixing cover 8 provided openable and closable.

The original O is irradiated with a light source 9, its reflected light is formed to be condensed at a light receiving surface of the photoelectric conversion element 6 through mirrors 10, 11, and 12 and the focusing lens 5. The image of the original O placed on the original placement plate 7 is orderly read in each one line with the scanner portion 1, and output of the reading is converted into a digital image signal of 8 bits showing density of the image in an image processing portion (not shown).

The printer portion 2 includes an optical system unit 13 and an image forming portion 14 which incorporates an electrophotographic method capable of forming the image on paper P which is an image forming medium. That is to say, the image signal which is read from the original O with the scanner portion 1 is converted into the laser beam (hereinafter referred to as light beam) from the semiconductor laser oscillator after the processing is performed in the image processing portion (not shown). In the embodiment, the multi-light beam optical system using a plurality of semiconductor laser oscillators (two or more) is adopted.

A plurality of light beams outputted from the optical system unit 13 is focused at a point of the exposure position X on the photoconductor drum 15 of an image support as scanning light of a spot having necessary resolution and scan-exposed. Accordingly, an electrostatic latent image is formed on the photoconductor drum 15 according to the image signal.

An electrostatic charger 16 which charges its surface, a developer 17, a transfer charger 18, a peeling-off charger 19, and a cleaner 20 are provided in the vicinity of the photoconductor drum 15. The photoconductor drum 15 is rotated at predetermined circumferential speed by a driving motor (not shown) and charged by the electrostatic charger 16 provided opposite to the surface of the photoconductor drum 15. The plurality of light beams is focused in the form of the spot at the point of the exposure position X on the charged photoconductor drum 15.

The electrostatic latent image formed on the photoconductor drum 15 is developed with toner (developing agent) from the developer 17. By taking the timing at the point of the transfer position by a paper-feeding system, the photoconductor drum 15 in which the toner image is formed by the development is transferred by the transfer charger 18 onto the paper P supplied from a paper-feeding cassette 21. The toner image is fixed with a fixing device 26 in the paper P to which the toner image is transferred, and then the paper P is discharged to an external discharging tray 28 through a discharging roller 27.

The optical system unit 13 will be described below.

Figure 2:
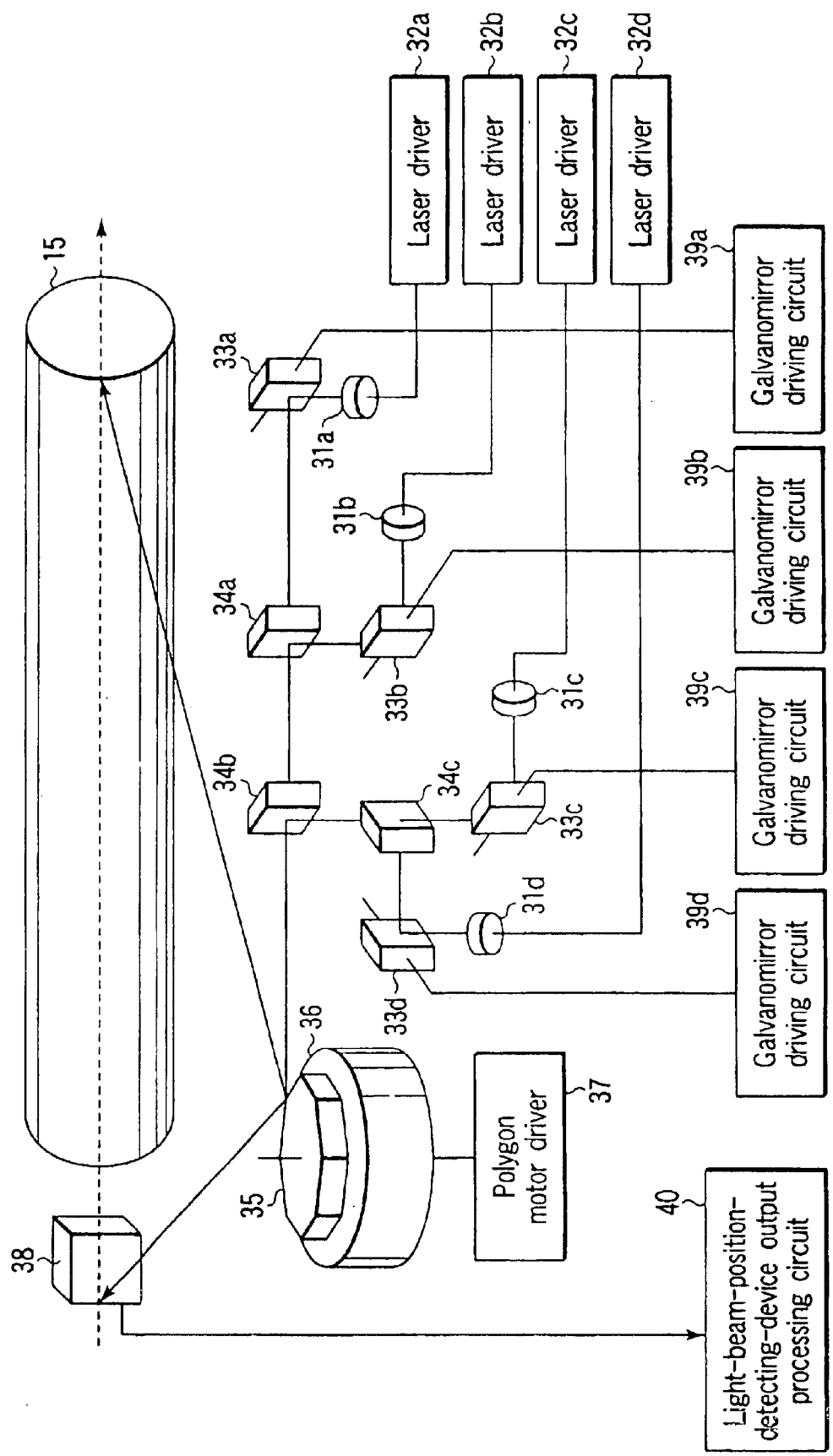
FIG. 2 shows a configuration of an optical system unit 13 and a positional relationship between the optical system unit 13 and a photoconductor drum 15.

FIG. 2 shows the configuration of the optical system unit 13 and the positional relationship between the optical system unit 13 and the photoconductor drum 15. For example, the optical system unit 13 contains the semiconductor laser oscillators 31a to 31d, and the high-speed image formation can be achieved without excessively increasing the number of rotations of the polygon mirror in such a manner that each of the semiconductor laser oscillators 31a to 31d simultaneously forms image in one line by one line.

That is to say, a laser driver 32a drives the semiconductor laser oscillators 31a, the outputted light beam is incident to a galvanomirror 33a as light path changing means after the light beam passes through the collimator lens (not shown). The light beam reflected by the galvanomirror 33a passes through half mirrors 34a and 34b and is incident to a polygon mirror 35 as a multi-surface rotating mirror.

The polygon mirror 35 is rotated at constant speed by a polygon motor 36 driven with a polygon motor driver 37. Accordingly, the reflected light from the polygon mirror 35 is scanned in the constant direction at angular speed determined by the number of rotations of the polygon mirror 36. The light beam scanned by the polygon mirror 35 passes through the f-θ lens and scans a light receiving surface of a light beam detecting device 38 as light beam passing-detecting means and light beam position detecting means and the photoconductor drum 15 by f-θ characteristics of the f-θ lens. Description concerning other three light beams is omitted due to the same configuration.

Each laser beam outputted from the individual semiconductor laser oscillators 31a to 31d is synthesized with half mirrors 34a, 34b, and 34c and four light beams advance toward the direction of the polygon mirror 35.

Accordingly, the four light beams can simultaneously scanned on the photoconductor drum 15, in the case that the number of rotations of the polygon mirror 35 is the same, the four light beams can record the image at four-time speed as compared with a conventional single beam.

The galvanomirrors 33a to 33d adjust (control) the positional relationship between the light beams in the sub-scanning direction, and galvanomirror diving circuits 39a to 39d which drives each galvanomirror are connected to the galvanomirrors 33a to 33d.

The light beam detecting device 38 detects the passing position, passing timing, and power of the four light beams and is provided in the vicinity of an end portion of the photoconductor drum 15 so that the surface of the light beam detecting device 30 is equivalent to the surface of the photoconductor drum 15. The control of the galvanomirrors 33a to 33d (control of image forming position in the sub-scanning direction), the control of emitting power (intensity) of the semiconductor laser oscillators 31a to 31d, and the control of light emitting timing (control of image forming position in the main scanning direction), which correspond to each light beam, are performed on the basis of a detecting signal from the light beam detecting device 38. In order to generate the signal for performing the control, a light-beam-detecting-device output processing circuit 40 is connected to the light beam detecting device 38.

Next, a control system will be described below.

Figure 3:
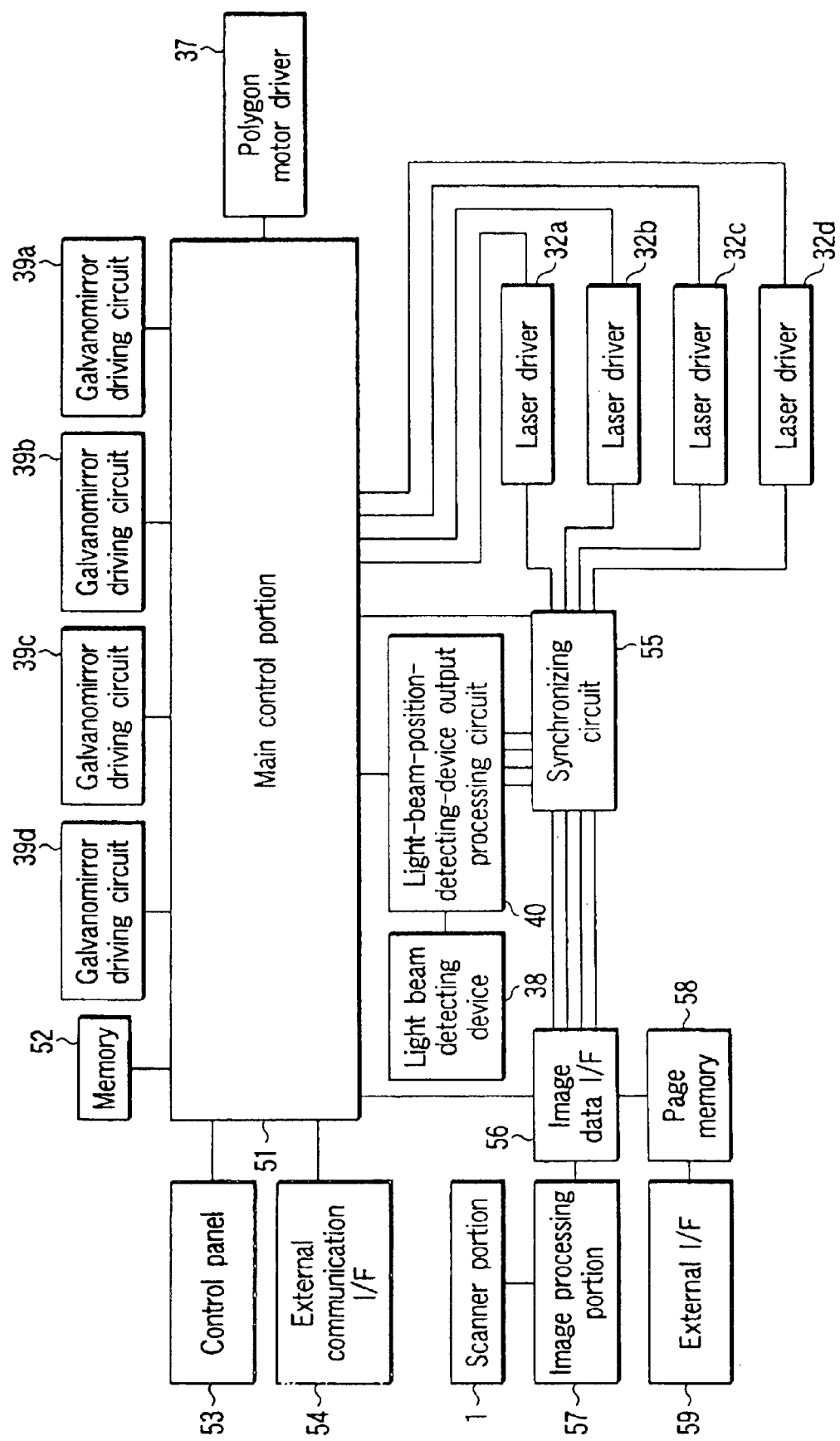
FIG. 3 shows a control system mainly containing control of a multi-beam optical system.

FIG. 3 shows the control system mainly containing the control of the multi-beam optical system. That is to say, a numeral 51 is a main control portion which performs the general control, for example the main control portion includes a CPU and comprehensively controls a memory 52, a control panel 53, an external communication interface (I/F) 54, the laser drivers 32a to 32d, the polygon mirror motor driver 37, the galvanomirror driving circuits 39a to 39d, the light-beam-detecting-device output processing circuit 40 as signal processing means, a synchronizing circuit 55, an image data interface (I/F) 56, and the like.

The image data I/F 56 is connected to the synchronizing circuit 55, and an image processing portion 57 and a page memory 58 are connected to the image data I/F 56. The scanner portion 1 is connected to the image processing portion 57 and an external interface (I/F) 59 is connected to the page memory 58.

At this point, when a flow of the image data in forming the image is simply described, the flow is as follows;

In the case of copying operation, as described above, the image of the original O set on the original placement plate 7 is read with the scanner portion 1 and sent to the image processing portion 57. The image processing portion performs, e.g. shading correction, various kinds of filtering, gray level processing, and gamma correction, which are known, to the image signal from the scanner portion 1.

The image data from the image processing portion 57 is sent to the image data I/F 56. The image data I/F 56 divide the image data among the four laser drivers 32a to 32d.

The synchronizing circuit 55 generates a clock synchronized with the timing which each light beam passes through the light beam detecting device 38. In synchronization with this clock, the synchronizing circuit 55 sends image data as a laser modulating signal from the image data I/F 56 to each of the laser drivers 32a to 32d. The control panel 53 is a man-machine interface which performs starting of the copying operation, setting of the number of copying paper, or the like.

In this manner, the image formation which is synchronized in the main scanning direction, i.e. the image formation into the correct position is performed by transferring the image data while the transfer is synchronized with the scanning of each light beam.

The galvanomirror driving circuits 39a to 39d are the circuits which drive the galvanomirrors 33a to 33d according to the indicated value from the main control portion 51. Accordingly, the main control portion 51 can freely control each angle of the galvanomirrors 33a to 33d through the galvanomirror driving circuits 39a to 39d. The passing position in the sub-scanning direction of the light beam is detected with the light beam detecting device 38 which will be described later, and the main control portion 51 controls the galvanomirror driving circuits 39a to 39d so that the passing position becomes the desired position.

The polygon motor driver 37 is the driver which drives the polygon motor 36 for rotating the polygon mirror 35 scanning the four light beams described above. The main control portion 51 can perform start and stop of the rotation and switching of the number of rotations for the polygon motor driver 37. The switching of the number of rotations is performed in changing a recording pitch (resolution).

The laser drivers 32a to 32d generate the laser beam according to the laser modulating signal synchronized with the scanning of the light beam from the synchronizing circuit 55 described above and have a function of forcedly and individually emitting the semiconductor laser oscillators 31a to 31d according to a forced light-emitting signal from the main control portion 51 while the forced light-emitting operation is irrelevant to the image signal.

This function is adopted in forcedly emitting operation of each of the laser oscillators 31a to 31d in the case of the scanning-exposure positional control by the light beam or execution of light beam power control, which are described later.

The main control portion 51 sets light-emitting power of the semiconductor laser oscillators 31a to 31d for the laser drivers 32a to 32d. The setting of the light-emitting power is changed according to a change in process conditions or the passing position detection of the light beam. Each of the light-emitting power of the semiconductor laser oscillators 31a to 31d is controlled so as to be equal. The control of the light-emitting power is preformed prior to the control of the main scanning direction and the control of the sub-scanning direction of the light beam, which are shown below. Unless the control of the light-emitting power is performed at first in the light beam control, the light-emitting power of each light beam is different and the control of the main scanning direction and the control in the sub-scanning direction of the light beam can not be performed.

Figure 4:
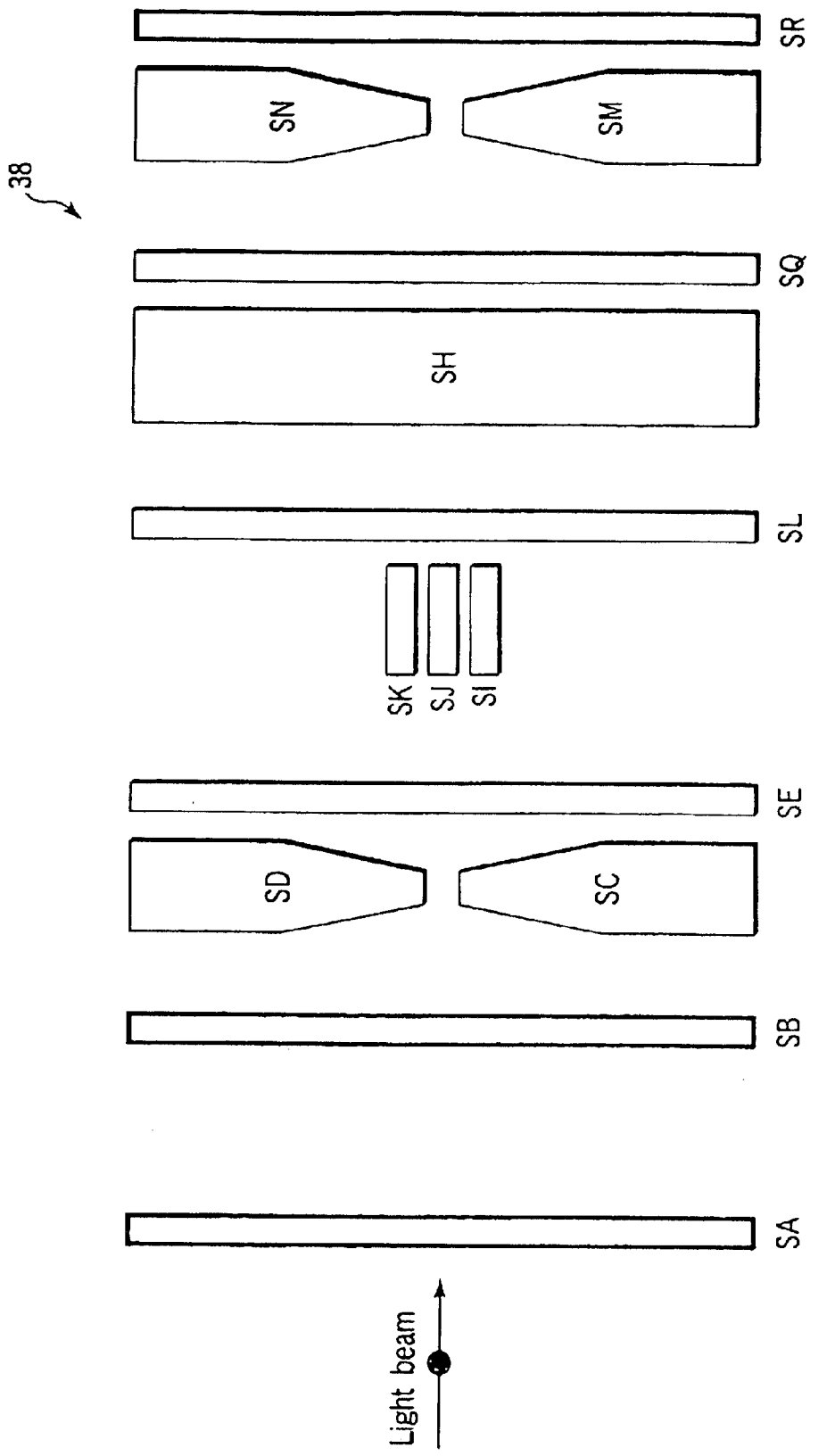
FIG. 4 is an exploded view of a light receiving portion of a conventional detecting sensor 38 for beam passing position which is used in the multi-beam optical system.

FIG. 4 is the exploded view of the light receiving portion of the sensor 38 for detecting beam passing position which is used in the multi-beam optical system. Sensors SA, SB, S, SD, SI, SJ, SK, SL, SM, SN, SH, SQ, and SR are made by the photoelectric conversion element (photodiode), and the sensors output current proportional to light amount when the sensors receive the light. Main scanning control function in the light receiving portion related to the invention will be mainly described below.

The beam passing timing sensor SA is used with the beam passing timing sensor SB and generates a reference signal of the main scanning control and the beam passing timing control. The beam passing timing sensor SR is one for adjusting the beam passing timing in the case of the main scanning control. In the main scanning control, the light-emitting timing is controlled so that the plurality of scanning beams pass through the position of the timing sensor SR after the scanning beams pass through the timing sensor SB.

Then, beam light-emitting timing control will be described. For example, the beam light-emitting timing control is to control the light-emitting timing of the laser beam so that the exposure positions of the multi-beam correspond in the sub-scanning direction, in the case that a straight line is formed in the sub-scanning direction by using the multi-beam.

Figure 5:
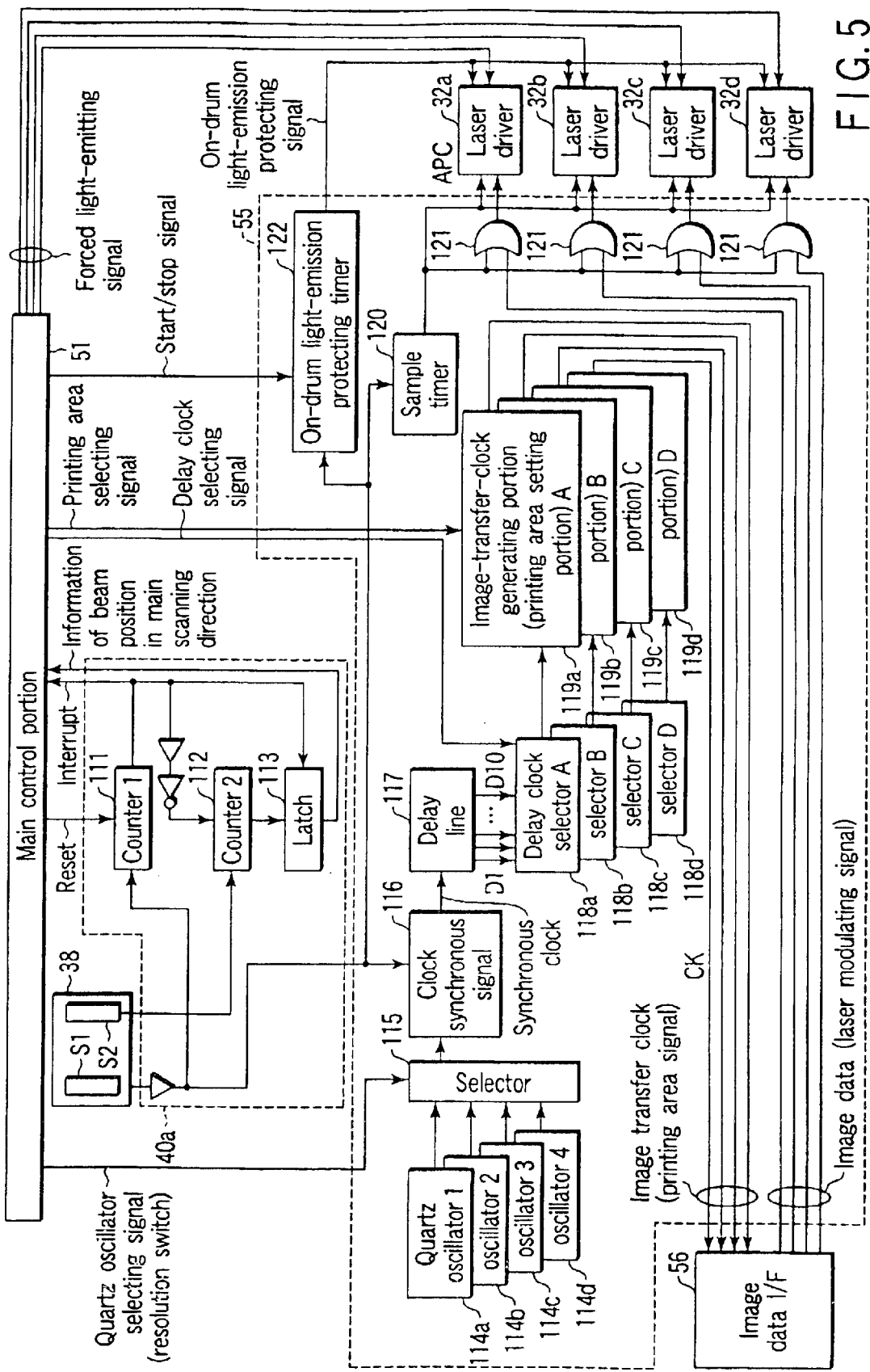
FIG. 5 mainly shows the configuration for setting an exposure area in fine unit not more than one-pixel-clock period.

FIG. 5 mainly shows the configuration for setting a printing area (exposure area) in fine unit not more than one-pixel-clock period (corresponding to one dot on the paper), corresponds to the synchronizing circuit 55, the light-beam-detecting-device output processing circuit 40, and the light beam detecting device 38 in the block diagram shown in FIG. 3.

In FIG. 5, a main-scanning direction light-beam-detecting-device output processing circuit 40a includes a first counter 111 and a second counter 112, and a latch circuit 113.

The synchronizing circuit 55 includes four quartz oscillators 114a to 114d, a selector 115 which selects the quartz oscillators 114a to 114d, a clock synchronizing circuit 116, a delay line 117, four delay clock selectors 118a to 118d, four image-transfer-clock generating portions (printing area setting portion) 119a to 119d, a sample timer 120, an OR gate circuit 121, and a on-drum light-emission prohibiting timer 122. One of the four quartz oscillators 114a to 114d is selected with the selector 115 corresponding to the image resolution.

As shown in FIG. 5, the sensor SA of the light beam detecting device 38 is exposed by a front-end beam among light beams a, b, c, and d which are forcedly emitted by the sample timer 120, and a signal output level becomes "H" (high level) from "L" (low level). The signal is inputted to the sample timer 120 and the forced light-emission of the semiconductor laser oscillators 31a to 31d is entirely released.

Accordingly, the light beams a, b, c, and d are eliminated and the high output of the sensor SA is eliminated.

Figure 6:
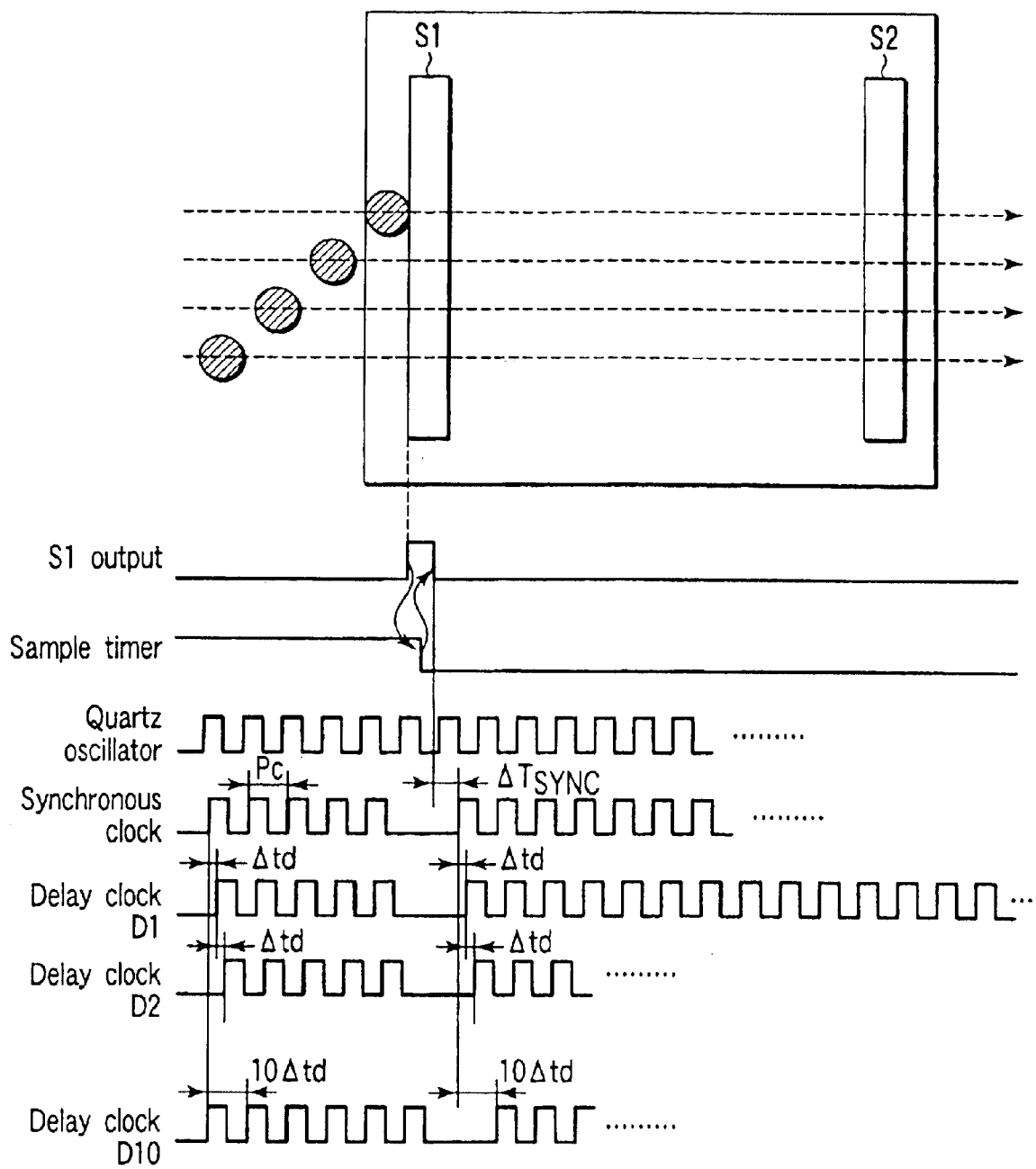
FIG. 6 is a view for illustrating a synchronous clock.

The output of the sensor SA is also inputted to the clock synchronizing circuit 116 in the synchronizing circuit 55. The clock synchronizing circuit 116 outputs the synchronous clock. As shown in FIG. 6, the synchronous clock is the clock which rises from a trailing edge of the output of the sensor SA with delay of $\Delta T_{SYNC}$. The synchronous clock is also the clock which synchronizes with the output of the sensor SA and has the same frequency as the output clock of the quartz oscillator.

Then, the synchronous clock is inputted to the delay line 117. The delay line 117 has the function of delaying the inputted signal for predetermined time. The delay line 117 shown in FIG. 5 has ten taps as the output. That is to say, a delay clock D1 outputted from a first step tap becomes the clock delayed by Δtd relative to the inputted synchronous clock, and a delay clock D2 outputted from a second step tap becomes the clock delayed by 2·Δtd relative to the inputted synchronous clock. The delay Δtd is actually several nanoseconds.

A delay clock D10 outputted from a final step (tenth step) tap becomes the clock delayed by 10Δtd relative to the inputted synchronous clock. In the embodiment, one-tenth of one period of the synchronous clock is almost equal to Δtd. That is to say, the delay clock D10 has almost the same phase for the inputted synchronous clock and is shifted by one clock relative to the inputted synchronous clock.

In the embodiment, though the delay amount of the delay line 117 is set to one-tenth of one clock, in the case that the setting of the printing area is required more accurately, the delay amount per one tap may be decreased and the number of taps may be increased.

The output from the delay line 117, i.e. the delay clocks D1 to D10 are inputted to the delay clock selectors 118a to 118d corresponding to the light beams a to d. The function of the delay clock selectors 118a to 118d selects the clock, which is outputted to the image-transfer-clock generating portions (printing area setting portion) 119a to 119d of the next step, on the basis of a delay clock selecting signal outputted from the main control portion 51 for each selector. In other words, the main control portion 51 can freely select the clock for setting the printing area among the delay clocks D1 to D10 in each of the light beams a to d.

Next, the image-transfer-clock generating portions (printing area setting portion) 119a to 119d will be described below. The main control portion 51 sets the printing area in each of the light beams a to d in one clock unit (one dot or one pixel unit) by using a printing area setting signal. That is to say, the main control portion 51 can set the output timing and the number of outputs of the image transfer clock for each light beam. In the case of the usual image formation, as described above, the image forming area of each of the light beams a to d is set so as to become the objective image forming area on the photoconductor drum 15. The objective image forming area is changed by the size of the paper used or the setting of a binding space.

The image transfer clock (printing area signal) obtained in the above-describe way is sent to the image data I/F 56, and the image data (laser modulating signal) corresponding to each of the light beams a to d is outputted synchronizing with the image transfer clock (printing area signal), i.e. at an image transfer clock period. Accordingly, an image transfer clock signal CK is also referred to as a pixel clock.

The laser drivers 32a to 32d modulate the semiconductor laser oscillators 31a to 31d with the image data (laser modulating signal). The image transfer clock signal CK outputted from the image-transfer-clock generating portions 119a to 119d in adjusting the exposure position in the main scanning direction is used as the pixel clock for the exposure. The corresponding semiconductor laser oscillator 31 is forcedly emitted during a period of the clock generation.

The main control portion 51 can set the printing area in one clock unit (one dot unit) with the printing area setting signal for the image-transfer-clock generating portions 119a to 119d. Further, the main control portion 51 can set the printing area in one-tenth clock unit (one-tenth dot unit) with the delay clock selecting signal for each of the delay clock selectors 118a to 118d while the printing area is independent of each of the light beams a to d. The detailed description of this circuit operation is disclosed in U.S. Pat. No. 6,208,367 "Light Beam Scanning Apparatus and Image Forming Apparatus" assigned to the same assignor of the invention.

The schematic operation of beam light-emitting timing control will be simply described.

Figure 7:
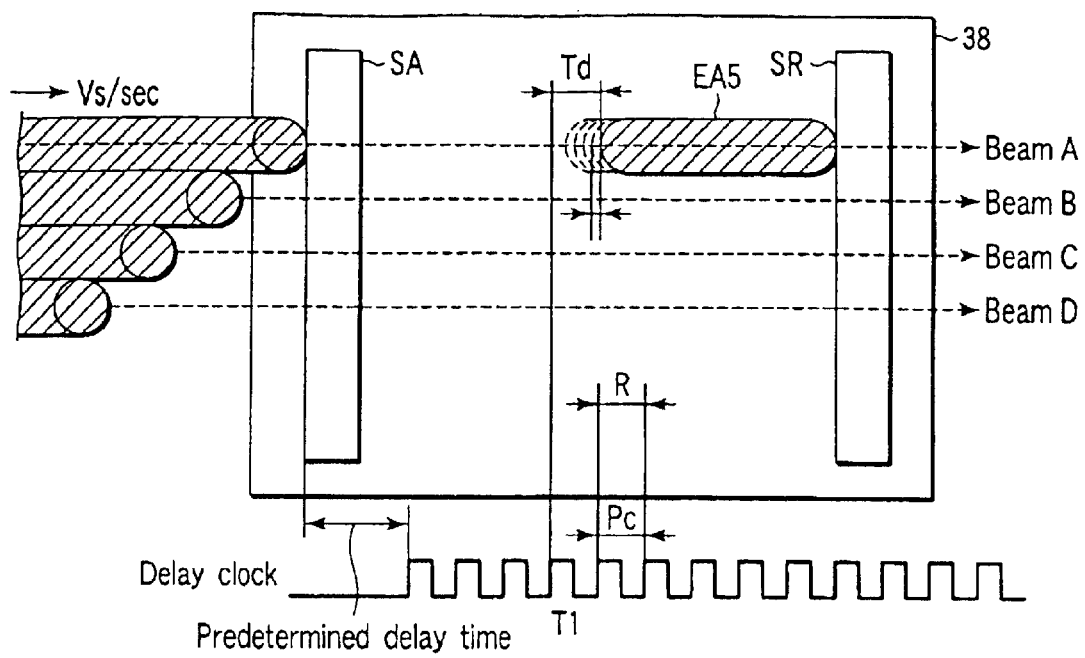
FIG. 7 shows the case in which an area between sensors SA and SR on a light beam detecting device 38 is irradiated with five-pixel-clock beams.

FIG. 7 shows the exposure area EA5 in which the area between the sensors SA and SR on a light beam detecting device 38 is irradiated with the five-pixel-clock beams. A sign of r is the minimum amount of adjustment in the main scanning direction and corresponds to the delay time of one tap of the delay line 117, i.e. the minimum delay time. As shown in FIG. 7, the delay clock is generated after a sensor pattern SA is started to be irradiated with the light beam and a predetermined time elapses. A period Pc is equal to the period of the image transfer clock, i.e. the pixel clock CK. A distance R is the distance of one dot. Assuming that the scanning speed on the scanned surface of the light beam is set to Vs (m/sec) and the clock period is set to Pc (sec), then R=Vs·Pc (m). Assuming that the delay time of one tap is set to Δtd, the minimum amount of adjustment r becomes r=Vs·Δtd (m).

For example, as shown in FIG. 7, delay time Td from a rising point T1 of the pixel clock immediately before the five-pixel exposure area EA5 is adjusted so that a front-end portion of the exposure area EA5 is in contact with the sensor SR or partially overlapped with the sensor SR. The exposure position on the photoconductor drum is determined on the basis of the number of clocks and the delay time Td after the predetermined delay time, which are determined for each light beam. The exposure positions in the main scanning direction of the light beams a to d coincide with each other by performing the above-described control to the light beams a to d. In the copying machine of the embodiment, the beam position in the main scanning direction can be adjusted in unit of a fraction of one pixel.

In the main scanning control, the main control portion 51 first turns on all the light beams and scans them, turns off all the light beams after the front-end light beam passes through the timing sensor SA, emits only the light beam to be an object immediately before the timing sensor SA for, e.g. five dots, and monitors the output of the timing sensor SR. The setting of the dot value "5" is performed at the image interface 56, and the setting of the delay amount is performed at the delay line 117, the delay clock selector 118 (delay in tap unit), and the image-transfer-clock generating portion 119 (delay in dot unit). When the output from the timing sensor SR exists, the light beam is emitted in the vicinity of the timing sensor SR.

For example, an eight-face polygon mirror is used and the output of the timing sensor SR of two rotations of the polygon mirror is counted with the counter 112. Management of the two rotations of the polygon mirror can be performed by counting the signal generated from the output of the sensors SA and SR. In the case that the output of the timing sensor SR is outputted in 16 times (eight-face×two rotations), the light beam is emitted on the timing sensor SR. As the number of outputs of the sensor SR is decreased from 16, the be am light-emitting timing is separated from the sensor SR. In the case that the number of outputs of the timing sensor SR is zero, the light beam is not emitted on the timing sensor SR. The positional relationship between the beam light-emitting timing and the sensor SR can be recognized by counting the number of outputs of the timing sensor SR.

In the main scanning control, the exposure position (light-emitting timing) of the light beam is adjusted in dot unit (R unit corresponding to clock period Pc) and tap unit not larger than one dot (r unit of the minimum amount of adjustment corresponding to delay amount of one tap), and the values of the dot and the tap in the case that the output of the timing sensor SR is changed from 16 times to 15 times is set to the setting value in the main scanning direction control.

The above-described operation is performed to all the laser beams to be the object and the setting value of the beam light-emitting timing control of each light beam is measured.

Figure 8:
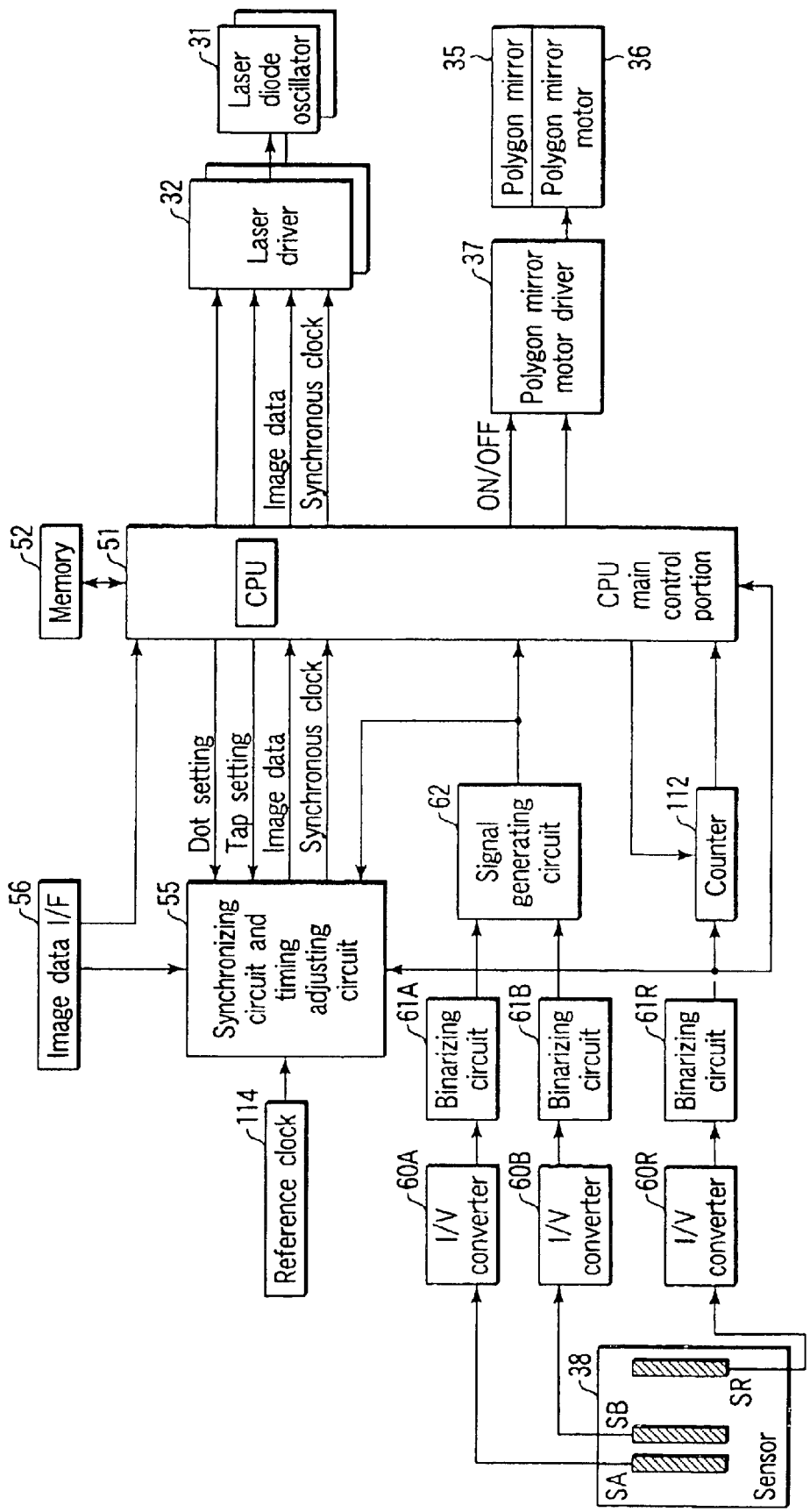
FIG. 8 is a block diagram in which the configuration of a main scanning control portion is integrally shown.

FIG. 8 is the block diagram integrally showing the configuration of the main scanning control portion. As described above, the main control portion (hereinafter referred to as CPU) 51 adjusts the light emitting timing of the laser beam in dot unit or in unit less than one dot (tap unit) by setting the data in the synchronizing circuit and the beam light-emitting timing adjusting circuit 55. For example, in the case that the minimum amount of adjustment of the tap is set to the one-tenth dot, the light-emitting timing of the laser beam can be adjusted in one-tenth dot unit. The beam light-emitting timing adjusting circuit 55 shifts the exposure position in unit not larger than one dot by finely delaying the light-emitting clock of the one dot unit.

The output of the timing sensors SA and SR is converted into a voltage value from a current value by I/V converters 60A and 60B, binarized by binarizing circuits 61A and 61B, and then outputted to a timing signal generating circuit 62. The timing signal generating circuit 62 generates the timing signal from the outputs of the sensors SA and SB, and the timing signal is inputted to the CPU 51, the synchronizing circuit, and the timing adjusting circuit 55.

The output of the timing sensor SR is converted into the voltage value by an I/V converter 60R, binarized by a binarizing circuit 61R, and then outputted to the counter 112. The counter counts the number of outputs of the timing sensor SR within the predetermined time for the CPU 51. For example, the CPU 51 can recognize how many times of output signals of the timing sensor SR are generated within the two rotations of the eight-face polygon mirror 35. In the case that the light beam is emitted on the timing sensor SR, a count value of 8×2=16 is outputted.

As described above, the shift in the main scanning direction by the main scanning control is corrected in unit not greater than one dot. However, since the delay time of each tap due to a change in temperature and the like is not constant, it is necessary that the shift of the main scanning timing is monitored and the tap value is always corrected. Further, since the number of taps is finite, the carry-up operation is required of dot value and tap value. That is to say, in the case that the tap value corresponding to one dot is previously determined, the tap value reaches the tap value corresponding to one dot (one pixel clock period), and the tap value is increased by one tap, one is added to the dot value and the tap value is set to zero (carry-up). In the case that the tap value is zero and the tap value is decreased, the dot value is decreased by one and the tap value is set to "the tap value of −1 corresponding to one dot" (carry-down). The shift of the main scanning exposure position is always corrected by the above-described operation.

Figure 9:
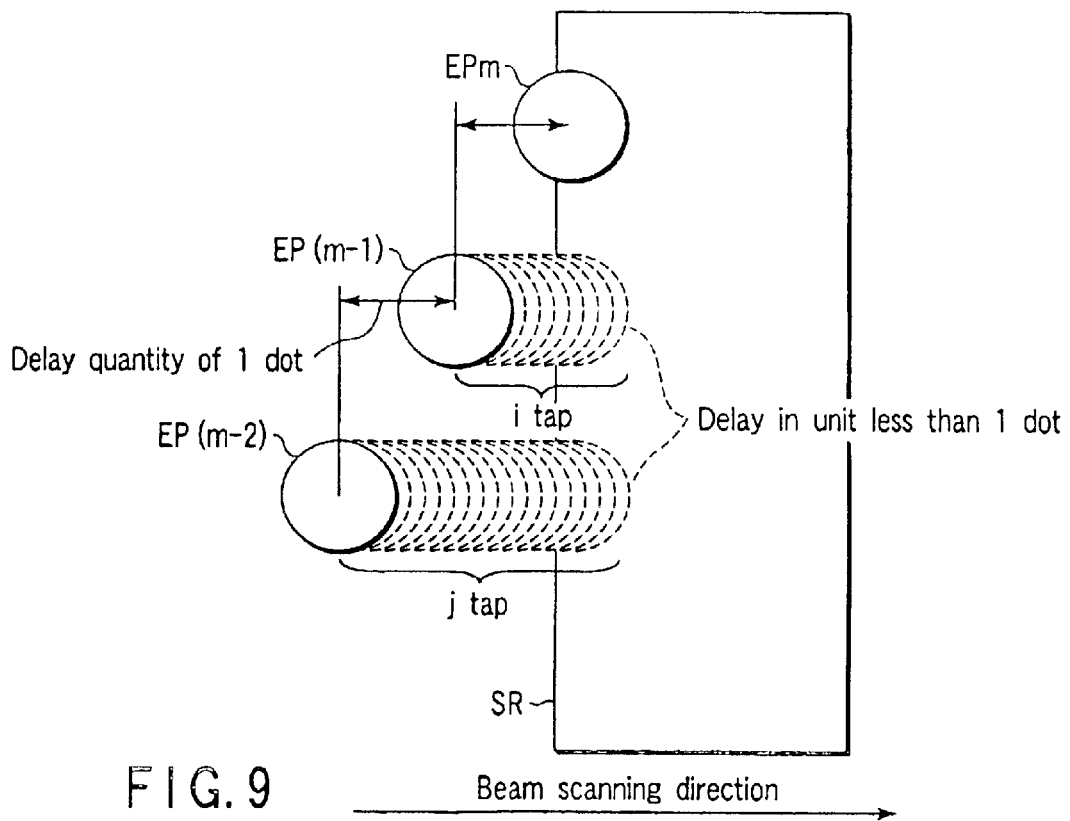
FIG. 9 is a view for illustrating a tap value corresponding to one dot.

FIG. 9 is the view for illustrating the operation for determining the tap value corresponding to one dot.

The exposure position indicated by EPm in FIG. 9 shows the position in which the output from the timing sensor SR is outputted by the predetermined number at m dot after passing through the timing sensor SB. For example, the position in which the count value of 16 of the counter 112 is outputted to the CPU 51 is shown. That is to say, the CPU 51 increases the dot value until the exposure position becomes this position. Circles shown in FIG. 9 indicate a rearmost exposed area when the five-dot area is exposed with the light beam.

One dot is subtracted from m dot, the counter value of the timing counter SR is read, and the tap value is increased until it becomes the predetermined value. When the count value reaches the predetermined value, the dot value and the tap value at that time are stored in the memory. For example, assuming that the tap value is i tap at this point, (m−1 dot, i tap) is stored in the memory.

Then, one dot is subtracted from (m−1) dot, the counter value of the timing sensor SR is read, and the tap value is increased until it becomes the predetermined value. For example, assuming that the tap value is j tap at this point, (m−2 dot, j tap) is stored in the memory.

When the above-described difference is calculated, the tap value corresponding to one dot is determined.

One dot=(j−i) tap

Figure 10:
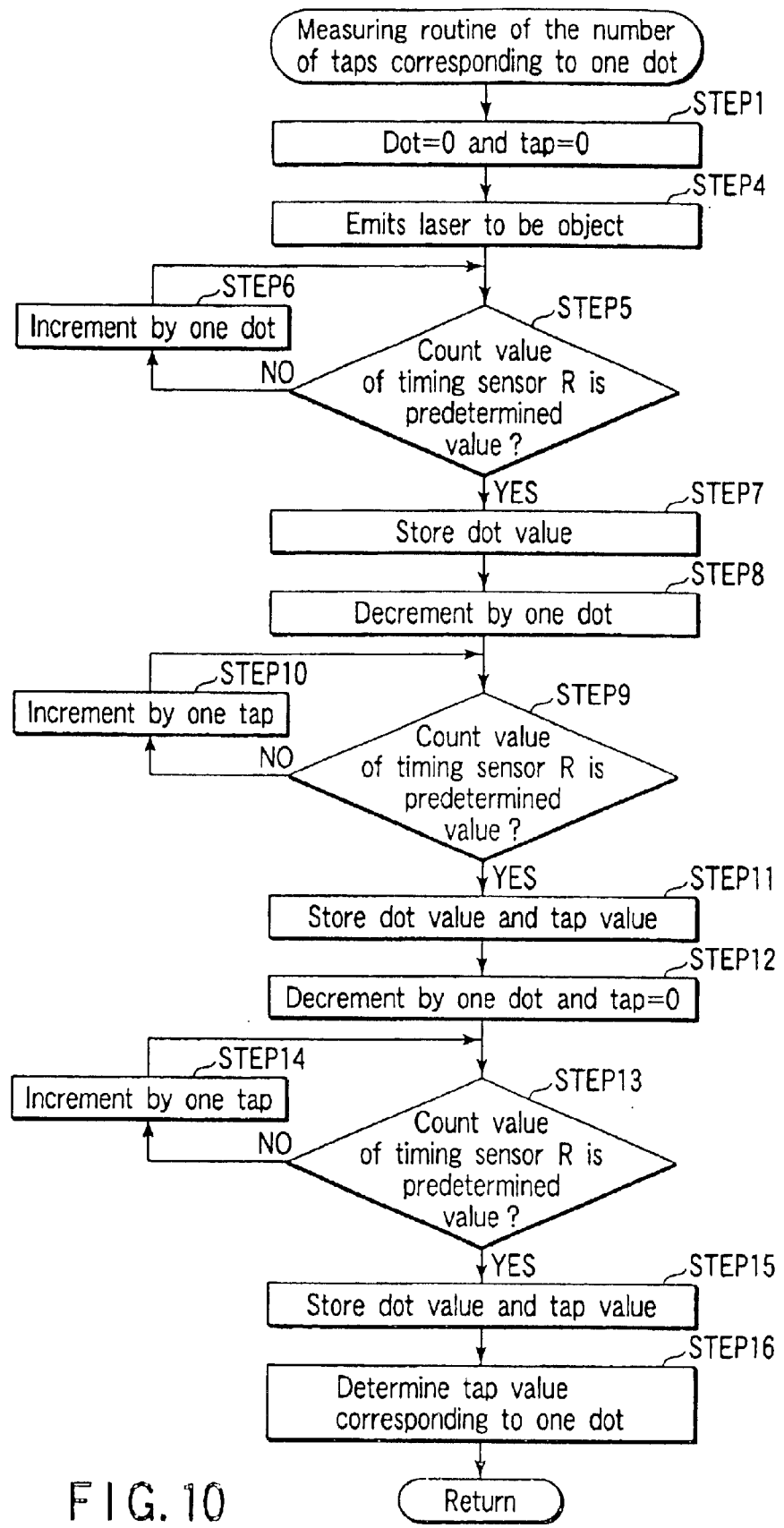
FIG. 10 shows a flow chart for determining the tap value corresponding to one dot.

FIG. 10 is the flow chart of the operation.

At first, the CPU 51 sets the dot value and the tap value of each light beam to zero (STEP 1). In the embodiment, though the dot value is set to zero, a proper value may be set from the positional relationship between the timing sensor SB and the timing sensor SR. In that case, there is an advantage that executing time of the measuring routine is reduced.

The CPU 51 emits all the light beams, and turns on the laser beam to be measured and turns off the laser beam not to be the measuring object when the output of the timing sensor SB is outputted (STEP 4). Then, the CPU 51 decides whether the count value of output of the timing sensor SR is the predetermined value or not (STEP 5). If the count value is not the predetermined value, the flow is moved to STEP 6. If the count value is the predetermined value, the flow is moved to STEP 7.

In STEP 6, the CPU 51 increases the dot to be emitted by one dot. When the dot is increased by one dot, the light-emitting timing is shifted to the downstream side in the light beam scanning direction by one dot. That is to say, the light-emitting timing approaches the timing sensor SR. The CPU 51 repeats the operation of STEP 5 and STEP 6 until the count value of the timing sensor SR becomes the predetermined value, and the CPU 51 adjusts the light-emitting timing (increases the dot value) until the exposure position reaches the position on the timing sensor SR. In STEP 7, the CPU 51 stores the dot value at that time in the memory.

In STEP 8, the CPU 51 decreases the dot to be emitted by one dot (see position of "m−1" dot in FIG. 8). In STEP 9, similarly to STEP 5, the CPU 51 decides whether the count value of output of the timing sensor SR is the predetermined value or not. If the count value is not the predetermined value, the flow is moved to STEP 10. If the count value is the predetermined value, the flow is moved to STEP 11.

In STEP 10, the CPU 51 leaves the dot to be emitted and increases the tap by one tap. When the tap to be emitted is increased by one tap, the exposure position approaches the downstream side in the light beam scanning direction by one tap. That is to say, the exposure position approaches the timing sensor SR. The CPU 51 repeats the operation of STEP 9 and STEP 10 until the count value of the timing sensor SR becomes the predetermined value, and the CPU 51 adjusts the light-emitting timing (increases the tap value) until the light-emitting point reaches the position on the timing sensor SR. In STEP 11, the CPU 51 stores the dot value and the tap value at that time in the memory.

In STEP 12, the CPU 51 further decreases the dot to be emitted by one dot and the tap value is set to zero (see exposure position EMm-2 dot in FIG. 9). In STEP 13, similarly to STEP 5 and STEP 9, the CPU 51 decides whether the count value of output of the timing sensor SR is the predetermined value or not. If the count value is not the predetermined value, the flow is moved to STEP 14. If the count value is the predetermined value, the flow is moved to STEP 15.

In STEP 14, the CPU 51 leaves the dot to be emitted and increases the tap by one tap. When the tap to be emitted is increased by one tap, the light-emitting timing approaches the downstream side in the light beam scanning direction by one tap. That is to say, the light-emitting timing approaches the timing sensor SR. The CPU 51 repeats the operation of STEP 13 and STEP 14 until the count value of the timing sensor SR becomes the predetermined value, and the CPU 51 adjusts the light-emitting timing (increases the tap value) until the light-emitting point reaches the position on the timing sensor SR. When the count value becomes the predetermined value, the CPU 51 stores the dot value and the tap value at that time in the memory (STEP 15). In STEP 16, the CPU 51 decreases the tap value stored in the memory in STEP 11 from the tap value stored in the memory in STEP 15 and determines the tap value corresponding to one dot.

Figure 11A:
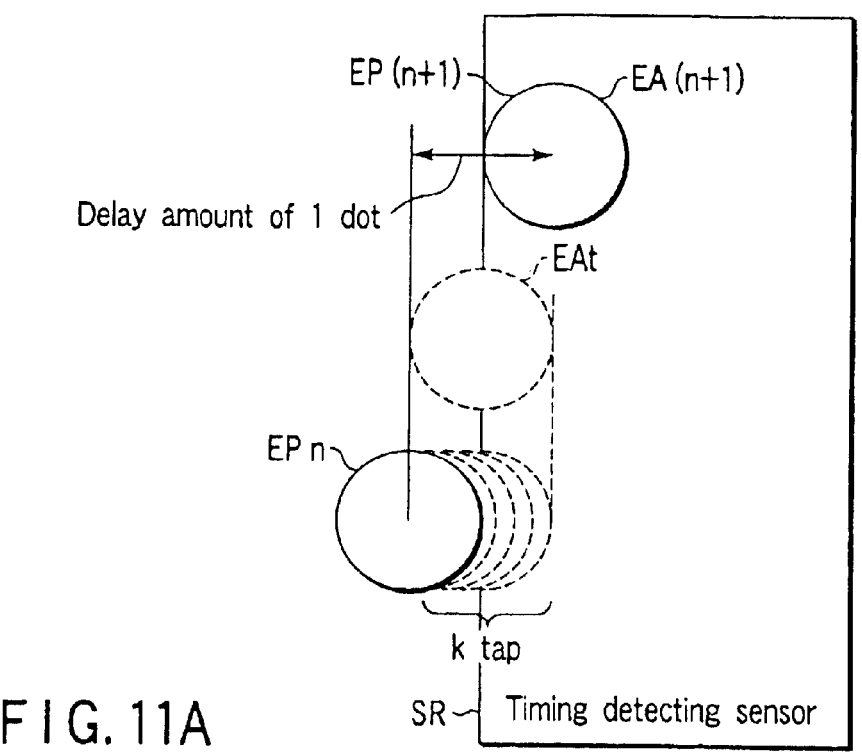
Figure 11B:
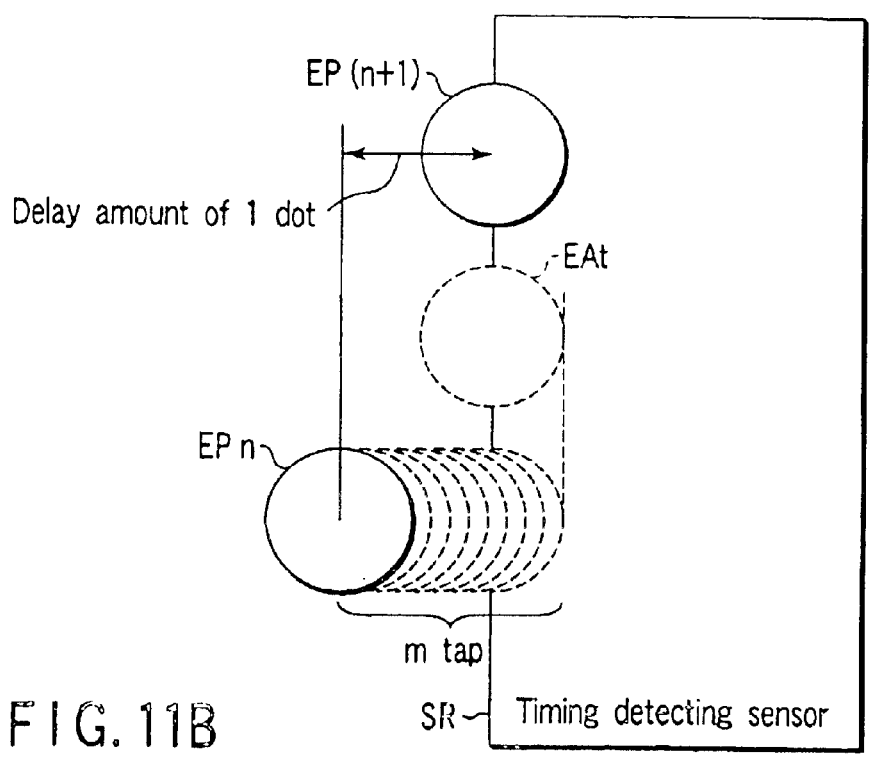

The main scanning control in the case that the beam light-emitting timing (exposure position) is changed by the change in temperature and the like will be described referring to FIGS. 11A and 11B. This is executed, e.g. during a standby state or a printing interval between papers. "The printing interval between papers" shows the time from the completion of the printing of one paper to the start of the printing of the next paper during the copying. FIG. 11A shows the state in which the predetermined value is outputted as the count value of the timing sensor SR of n dots and k taps as a result of the main scanning control. An exposure position Eat is the objective exposure position. On the other hand, FIG. 11B shows the state in which the tap value is increased to m tap so that the exposure position returns to the objective position because the beam light-emitting timing (exposure position) is changed by influence of the temperature or the like and shifted to the upstream side in the light beam scanning direction. Further, since the tap value is m corresponding to one dot in the embodiment, the dot value is increased by one and the tap value is set to zero (carry-up). That is to say, the dot value is set to n+1 dot and the tap value is set to zero (see exposure position EP(n+1)).

The carry-up and the carry down of the dot and the tap will be specifically described referring to FIG. 12. FIG. 12 is the view showing the relationship between the dot and the tap. A vertical axis shows the dot value and a horizontal axis shows the tap value. In this case, the tap value corresponding to one dot is 10 and it is assumed that nine taps are provided in the apparatus. When the tap value reaches 10, the dot is increased by one and the tap value is set to zero. That is to say, when the dot value reaches n dots and the tap value reaches 10 taps, the dot value is set to (n+1) dots and the tap value is set to zero (carry-up), and then the tap value is increased for (n+1) dots. On the contrary, in the case that the tap value is zero and further decreased by one tap, the dot value is set to n dots and the tap value is set to (10−1) taps.

Figure 13:
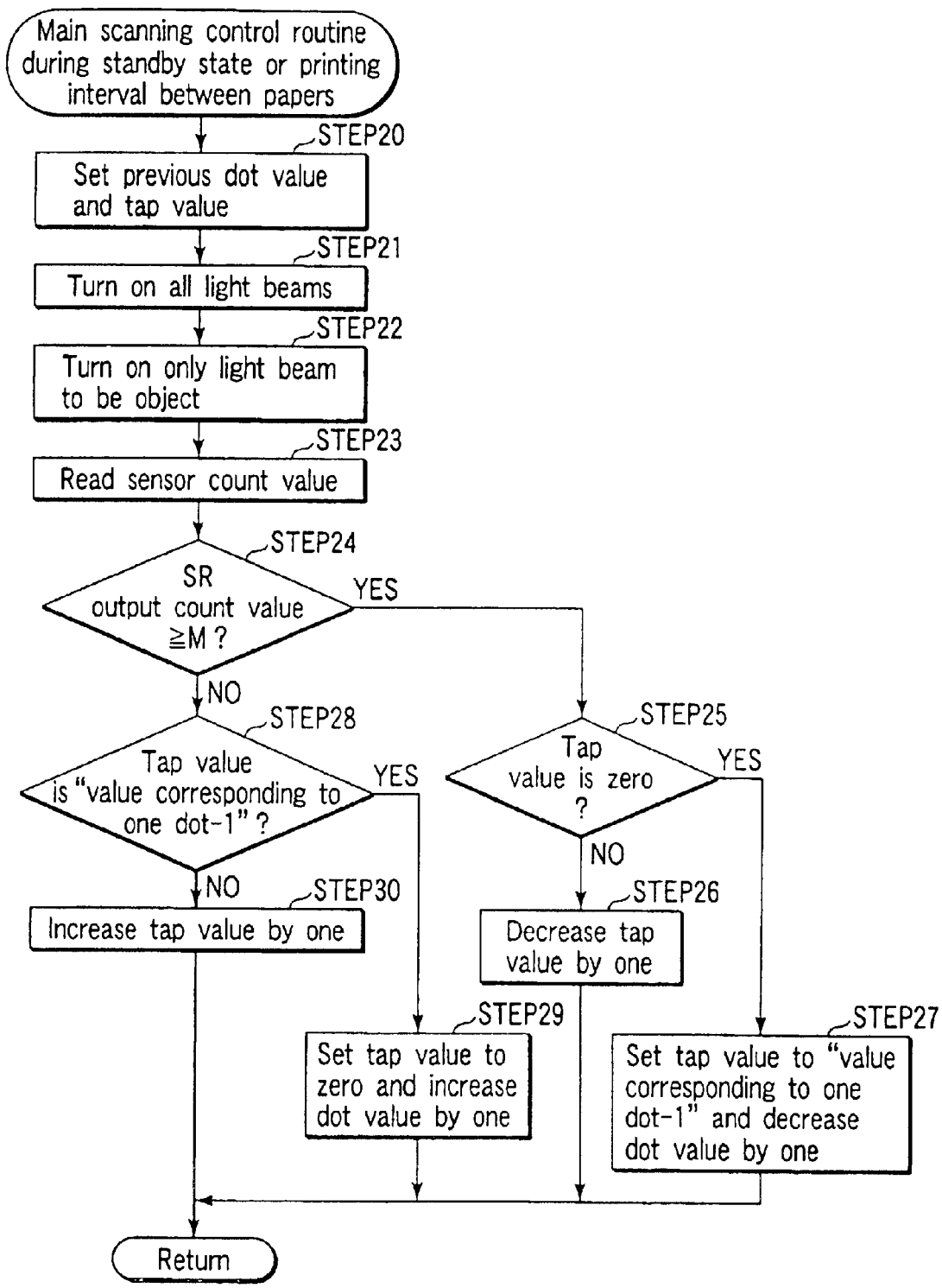
FIG. 13 is a flow chart showing a main scanning control routine during standby and control between papers.

FIG. 13 is the view in which the above-described operation is shown in the flow chart. As described above, the operation is the main scanning control routine of the timing other than the case of the image formation, i.e. during the standby state and the printing interval between papers.

Since the main scanning control routine is performed after the beam light-emitting timing control has been executed once, the dot value and the tap value which are the previous control vale are set at first (STEP 20).

All the light beam are turned on (STEP 21), the light beam is scanned on the sensor by the rotation of the polygon mirror, only the laser beam to be measured is emitted after passing through the timing sensor SB, and the laser beam not to be measuring object is turned off (STEP 22).

The CPU 51 reads the count value of the timing sensor SR from the counter (STE). The CPU 51 decides whether the count value of output of the timing sensor SR is a predetermined value M or not (STEP 24). For example, in the case that the polygon mirror consists of a 12-face mirror, the predetermined value M is 6. If the count value is smaller than the predetermined value M, the flow is moved to STEP 28. If the count value is not smaller than the predetermined value M, the flow is moved to STEP 25.

In STEP 25, the CPU 51 decides whether the tap value is zero or not. If the tap value is zero, the flow is moved to STEP 27. If the tap value is not zero, the flow is moved to STEP 26. For the case in which the flow is moved to STEP 25, the laser beam to be measured is placed on the timing sensor SR. Accordingly, the CPU 51 performs the operation for shifting the light-emitting timing by one tap to the upstream side in the scanning direction by one tap in STEP 26 or STEP 27. In that case, the CPU 51 decides whether the carry-down of the dot value and the tap value is required or not in STEP 25.

If the tap value is not zero, the tap value is decreased by one tap (STEP 26). If the tap value is already zero, i.e. if the tap value reaches the minimum value, the carry-down is performed. That is to say, the CPU 51 sets the tap value to "the value corresponding to one dot−1" (9 at this point) and decreases the dot value by one (STEP 27).

In STEP 28, the CPU 51 decides whether the tap value "the value corresponding to one dot−1" (9 at this point) or not. If the tap value is "the tap value corresponding to one dot−1," the flow is moved to STEP 29. If the tap value is "the tap value corresponding to one dot−1," the flow is moved to STEP 30. In STEP 28, since the count value of the timing sensor SR is smaller than the predetermined value M, the laser beam to be measured is not placed on the timing sensor SR or is in the vicinity of the timing sensor SR. Accordingly, the CPU 51 performs the operation for shifting the light-emitting timing by one tap to the downstream side in the scanning direction in STEP 30 or STEP 28. In that case, the CPU 51 decides whether the carry-up of the dot value and the tap value is required or not in STEP 28.

If the tap value does not reach "the value corresponding to one dot−1," the CPU 51 increases the tap value by one tap and shifts the light-emitting timing by one tap to the downstream in the main scanning direction (STEP 30). If the tap value reaches "the tap value corresponding to one dot−1," the carry-up is performed. That is to say, the CPU 51 sets the tap value to zero and increases the dot value by one (STEP 29).

The above-described operation is executed for the laser beam to be measured and the main-scanning light-beam passing timing is always finely adjusted. However, in this method, since a threshold of the carry-up/carry-down of the tap is one, there is a possibility that the carry-up/carry-down occurs in vibratory. Though adjustment of the dot and the tap is performed with the electric circuit, the delay time in each one tap is very fine and fluctuation is easily generated by the change in environment such as the change in the temperature. In the case that the number of dots is changed in a stroke by "the tap value corresponding to one dot−1" by the carry-up/carry-down operation, there is the possibility that the delay time is changed greatly exceeding one dot. As a result, for example there is the possibility that the image, in which the shift in the main scanning direction is generated, is formed in each printing of the continuous copying.

Therefore, the embodiment provides the light beam scanning apparatus, in which the carry-up/carry-down of the dot and the tap is prevented from frequently generating during the main scanning control and the shift in the main scanning direction is small.

FIG. 14 shows the principle of the carry-up/carry-down of the dot and the tap according to the embodiment. The vertical axis shows the dot value and the horizontal axis shows the tap value. In the embodiment, three-tap hysteresis is set to the carry-up and carry-down operation as the example. Even in this case, the tap value corresponding to one dot is 10.

When the tap value reaches 10, the dot is increased by one and the tap value is set to zero. That is to say, when the dot value reaches n dots and the tap value reaches 10 taps, the dot value is set to (n+1) dots and the tap value is set to zero (carry-up), and then the tap value is increased for (n+1) dots. On the other hand, even if the tap value is zero in (n+1) dots, the carry-down is not performed. When the tap value becomes −3, the carry-down is initially performed. That is to say, the difference of three taps is provided between the thresholds of the carry-up and carry-down. Consequently, since the hysteresis is generated in the carry-up/carry-down, that the carry-up/carry-down operation becomes vibrational can be prevented.

However, there is the problem in practice for the carry-up/carry-down operation as it is. That is to say, since the tap is not actually set not smaller than zero, the hysteresis can not be provided. Therefore, the carry-up/carry-down operation is practically executed by adopting the method shown in FIG. 15.

Figure 15:
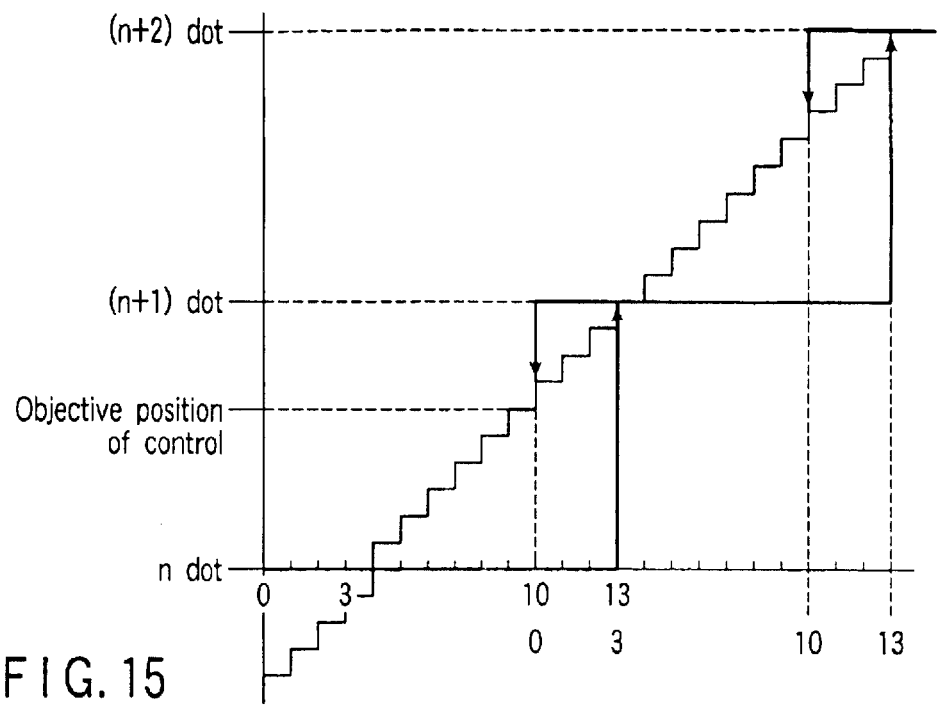
FIG. 15 is a view for illustrating operation of the carry-up/carry-down of the dot and the tap according to the first embodiment of the invention.

FIG. 15 is the view showing the relationship between the dot and the tap according to the first embodiment of the invention. The vertical axis shows the dot value and the horizontal axis shows the tap value. Even in this case, though the tap value corresponding to one dot is 10, the tap is provided not larger than 12 taps. In this case, when the tap value reaches 13, the dot is increased by one and the tap value is set to three. That is to say, when the dot reaches n dots and the tap reaches 13 taps, the dot is set to (n+1) dots and the tap is set to 3 taps (carry-up), and then the tap value is increased for (n+1) dots. On the other hand, when the tap value becomes zero at (n+1) dots, the carry-down is performed. Consequently, the difference of three taps can be provided between the thresholds of the carry-up and carry-down.

Figure 16:
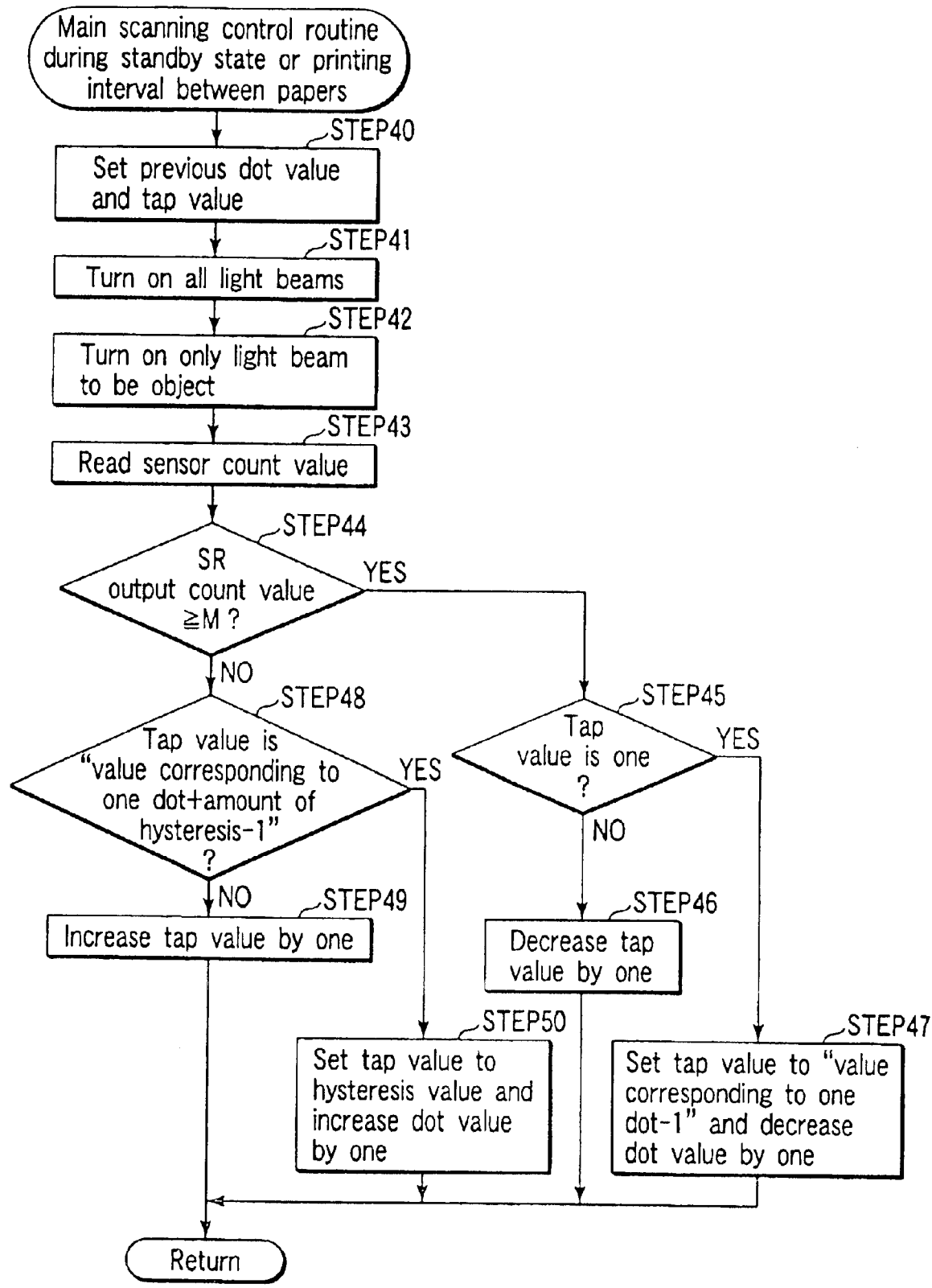
FIG. 16 is a flow chart showing the operation according to the first embodiment of the invention.

FIG. 16 is the flow chart showing the operation according to the embodiment.

Since STEP 40 to STEP 44 are the same as STEP 20 to STEP 24 in FIG. 13, the description is omitted. If the count value of the output of the timing sensor SR is not larger than the predetermined value M (in the case of YES in STEP 44), the CPU 51 decides whether the tap value is one or not (STEP 45). If the tap value is one, the flow is moved to STEP 47. If the tap value is not one, the flow is moved to STEP 46. In the case that STEP 45 is executed, the laser beam to be measured is placed on the timing sensor SR (the output of the timing sensor SR is outputted not smaller than the predetermined number of outputs). Accordingly, the CPU 51 performs the operation for shifting the light-emitting timing (exposure position) by one tap to the upstream side in the scanning direction in STEP 46 or STEP 47. In that case, the CPU 51 decides whether the carry-down of the dot value and the tap value is required or not in STEP 45.

If the tap value is not one, the tap value is decreased by one tap (STEP 46). That is to say, the CPU 51 shifts the light-emitting timing by one tap to the upstream side in the scanning direction. If the tap value is one, i.e. if the tap value already reaches the minimum value, the carry-down is performed (STEP 47). That is to say, the CPU 51 sets the tap value to "the value corresponding to one dot" (10 at this point) and decreases the dot value by one. The CPU 51 may decide whether the tap value is zero or not in STEP 45, if the tap value is zero, the CPU 51 may set the tap value to "the value corresponding to one dot−1" and decrease the dot value by one. In that case, the hysteresis becomes four taps.

If the count value of the output of the timing sensor SR is smaller than the predetermined value M (in the case of No in STEP 44), the CPU 51 decides whether the tap value is "the tap value corresponding to one dot+the amount of the hysteresis−1" (12 at this point) or not (STEP 48). If the tap value is "the tap value corresponding to one dot+the amount of the hysteresis−1," the flow is moved to STEP 50. If not, the flow is moved to STEP 49. In the case that STEP 48 is executed, since the count value of the timing sensor SR is smaller than the predetermined value M, the laser beam to be measured is not placed on the timing sensor SR or is in the vicinity of the timing sensor SR. In this case, the CPU 51 performs the operation for shifting the light-emitting timing (exposure position) by one tap to the downstream side in the scanning direction in STEP 49 or STEP 59. In that case, The CPU 51 decides whether the carry-up of the dot value and the tap value is required or not in STEP 48.

If the tap value does not reach "the tap value corresponding to one dot+the amount of the hysteresis−1," The CPU 51 increases the tap value by one and shifts the light-emitting timing by one tap to the downstream side in the scanning direction (STEP 49). If the tap value reaches "the tap value corresponding to one dot+the amount of the hysteresis−1," The CPU 51 increases the tap value by three (=hysteresis value) and the dot value by one and performs the carry-up (STEP 50).

As described above, the image forming apparatus according to the embodiment includes an exposure position setting portion (117, 119, and 56) setting the position of the exposure area exposed by the beam scanning of the scanning portion 35 as an additional value of a first setting value (dot value) which is set in a first unit (dot unit) corresponding to the scanning of the pixel clock period Pc and a second setting value (tap value) which is set in a second unit (tap unit) corresponding to the scanning of the period Δ·td smaller than the pixel clock period Pc.

The CPU 51 changes the setting of the exposure position setting portion according to the shift from the objective position of the exposure position EP during the standby state or the printing interval between papers and corrects the shift.

The CPU 51 includes a first changing portion (STEP 50) which increases the first setting value (dot value) by one unit and changes the second setting value (tap value) to a first predetermined value (3) in the case that the additional value of the exposure position setting portion is increased to reach a first threshold (n dots and 13 taps), and a second changing portion (STEP 27) which decrease the first setting value (dot value) by one unit and changes the second setting value (tap value) to a second predetermined value (10) in the case that the additional value of the exposure position setting portion, in which the first setting value is increased by one unit, is decreased to reach a second threshold (n+1 dots and 0 tap) smaller than the first threshold.

A second embodiment of the invention will be described below.

As described in the first embodiment, there is the possibility that the main scanning shift occurs in the carry-up/carry-down of the dot and the tap. In the second embodiment, frequency of the main scanning shift is reduced. In the second embodiment, the carry-up is not performed until the tap value in control becomes a predetermined integer multiple value of the tap value corresponding to one dot, and only the tap value is increased.

Figure 17:
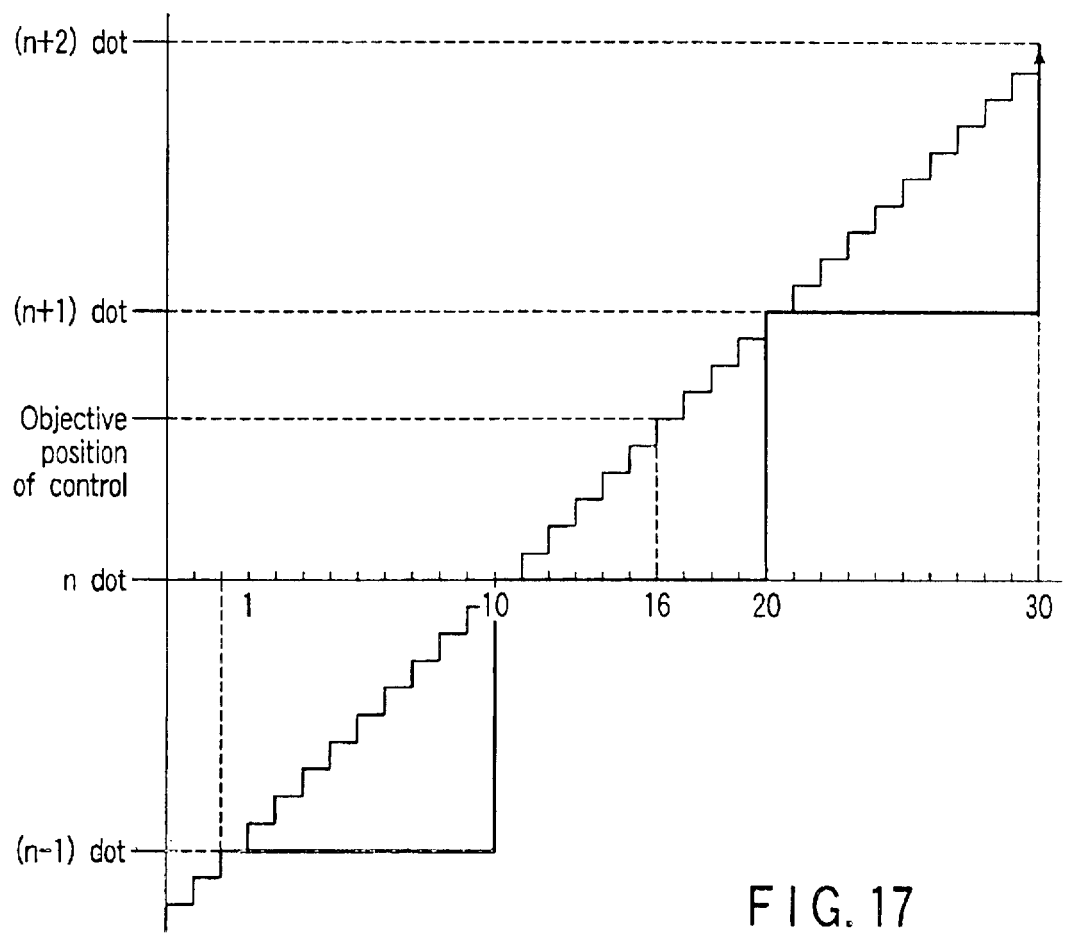
FIG. 17 is a view for illustrating the carry-up/carry-down of the dot and the tap according to a second embodiment of the invention.

FIG. 17 is the view showing the relationship between the dot and the tap according to the second embodiment. The vertical axis shows the dot value and the horizontal axis shows the tap value. At this point, though the tap value corresponding to one dot is 10, the case in which the taps for P dots (for example, three dots) are provided will be described. That is to say, the 10P (=30) taps are provided.

In the case that the position of the exposure area of the light beam is shifted by the change in the temperature and it is necessary to increase the tap value, the tap value is increased by one tap by one tap from the present tap value. In the conventional method, in the case that the tap value reaches the tap value corresponding to one dot, the carry-up of the dot is performed. However, in the embodiment, the carry-up is not performed until the tap value becomes 30 and only the tap value is increased. In FIG. 17, the objective position of the control, i.e. a central value is (n-1) dots and +16 taps. This position corresponds to the conventional n dots and 6 taps.

Since the delay time of one tap is very small, when the tap is increased one by one, the frequency of the large error in the main scanning direction is lessened unlike the conventional carry-up. However, since the number of taps is not infinite, the carry-up is performed when the tap value becomes the predetermined value. The predetermined value is determined by the relationship between the tap value of one dot and the amount of shift of the exposure position.

Figure 18:
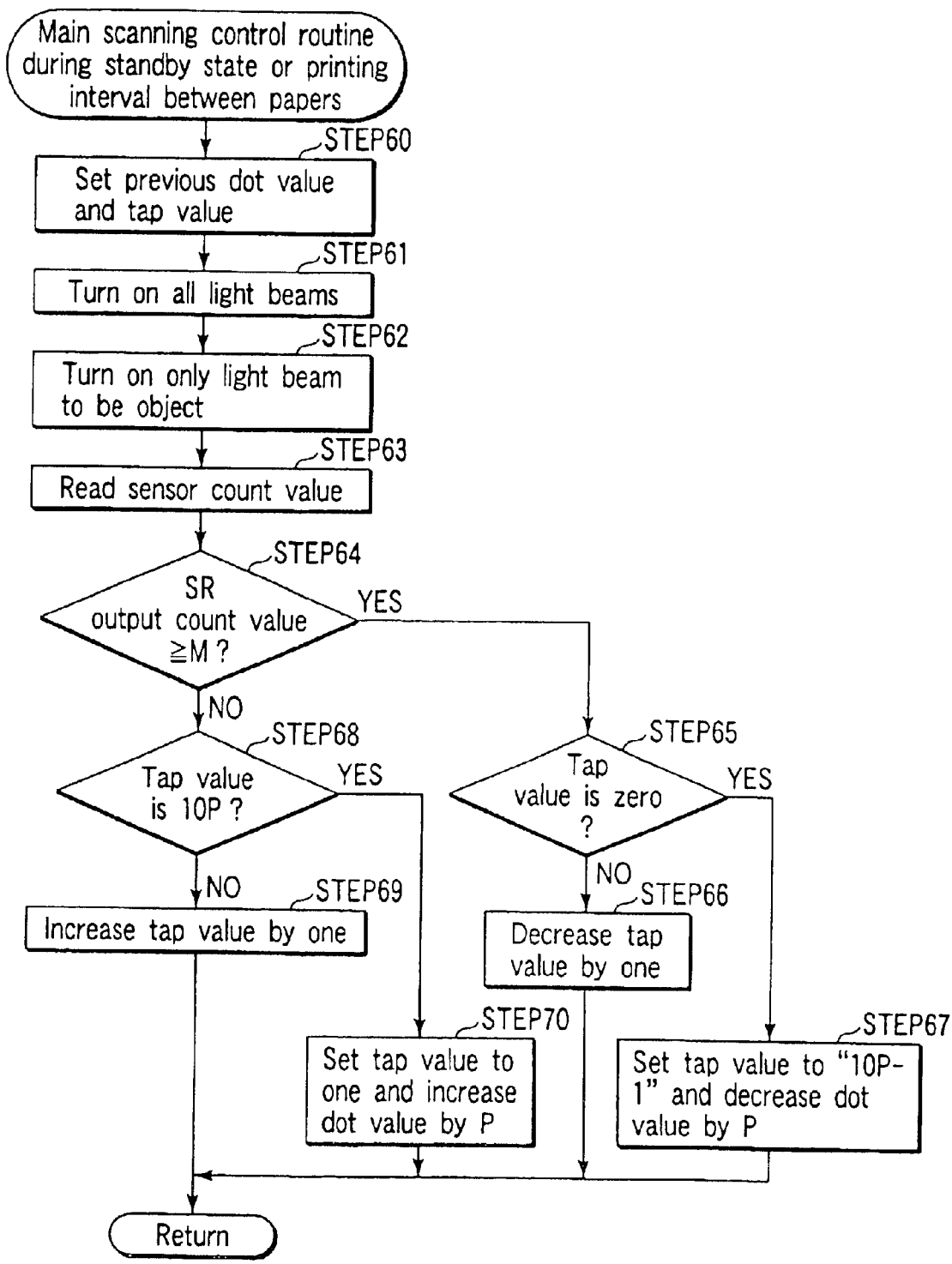
FIG. 18 is a flow chart showing the operation according to the second embodiment of the invention.

FIG. 18 is the flow chart showing the operation of the embodiment.

Since STEP 50 to STEP 54 are the same as STEP 20 to STEP 24 in FIG. 13, the description is omitted.

If the count value of the output of the timing sensor SR is not smaller than the predetermined value M (in the case of YES in STEP 64), the CPU 51 decides whether the tap value is zero or not (STEP 65). If the tap value is zero, the flow is moved to STEP 67. If the tap value is not zero, the flow is moved to STEP 66. In the case the STEP 65 is executed, the laser beam to be measured is placed on the timing sensor SR. Accordingly, the CPU 51 performs the operation for shifting the light-emitting timing (exposure position) by one tap to the upstream side in the scanning direction in STEP 66 or STEP 67. In that case, the CPU 51 decides whether the carry-down of the dot value and the tap value is required or not in STEP 65.

If the tap value is not zero, the CPU 51 decreases the tap value by one tap (STEP 66). If the tap value is zero, i.e. if the tap value already reaches the minimum value, the carry-down is performed (STEP 67). That is to say, the CPU 51 sets the tap value to "the value (10P) obtained by multiplying the value corresponding to one dot (10 at this point) by the integer (3 at this point)−1" and decreases the dot value by P.

If the count value of the output of the timing sensor SR is smaller than the predetermined value M (in the case of No in STEP 64), the CPU 51 decides whether the tap value is "the value (=10P) obtained by multiplying the value corresponding to one dot (10 at this point) by the integer P (3 at this point)" or not (STEP 68). If the tap value is 10P, the flow is moved to STEP 70. If not, the flow is moved to STEP 69. In the case that STEP 68 is executed, since the count value of the timing sensor SR is smaller than the predetermined value M, the laser beam to be measured is not placed on the timing sensor SR or is in the vicinity of the timing sensor SR. In this case, the CPU 51 performs the operation for shifting the light-emitting timing by one tap to the downstream side in the scanning direction in STEP 69 or STEP 70. In that case, the CPU 51 decides whether the carry-up of the dot value and the tap value is required or not in STEP 68.

If the tap value does not reach 10P, the CPU 51 increases the tap value by one and shifts the light-emitting timing by one tap to the downstream side in the scanning direction (STEP 69). If the tap value reaches 10P, the CPU 51 sets the tap value to one, increases the dot value by P (three at this point), and performs the carry-up (STEP 70).

As described above, the image forming apparatus according to the second embodiment includes the exposure position setting portion (117, 119, and 56) setting the position of the exposure area EA exposed by the beam scanning of the scanning portion 35 as the additional value of the first setting value (dot value) which is set in the first unit (dot unit) corresponding to the scanning of the pixel clock period Pc and the second setting value (tap value) which is set in the second unit (tap unit) corresponding to the scanning of the period Δ·td smaller than the pixel clock period Pc.

The CPU 51 changes the additional value of the exposure position setting portion according to the shift from the objective position of the exposure area EA during the standby state or the printing interval between papers and corrects the shift.

The CPU 51 includes a changing portion (STEP 70) which increases the first setting value (dot value) by the predetermined number (P) and changes the second setting value (tap value) in the case that the second setting value (tap value) is increased to the value more than the value (30) corresponding to a distance of a predetermined multiple (P) of the first unit (dot unit).

A third embodiment of the invention will be described below.

In the second embodiment, though the frequency of the carry-up/carry-down is decreased, when the carry-down or the like is generated, there is the possibility that the relatively large error is generated in the main scanning direction. In the third embodiment, the error of the light beam positioning in the main scanning direction is decreased as small as possible in such a manner that the carry-up/carry-down of the dot and the tap is not substantially generated.

Figure 19:
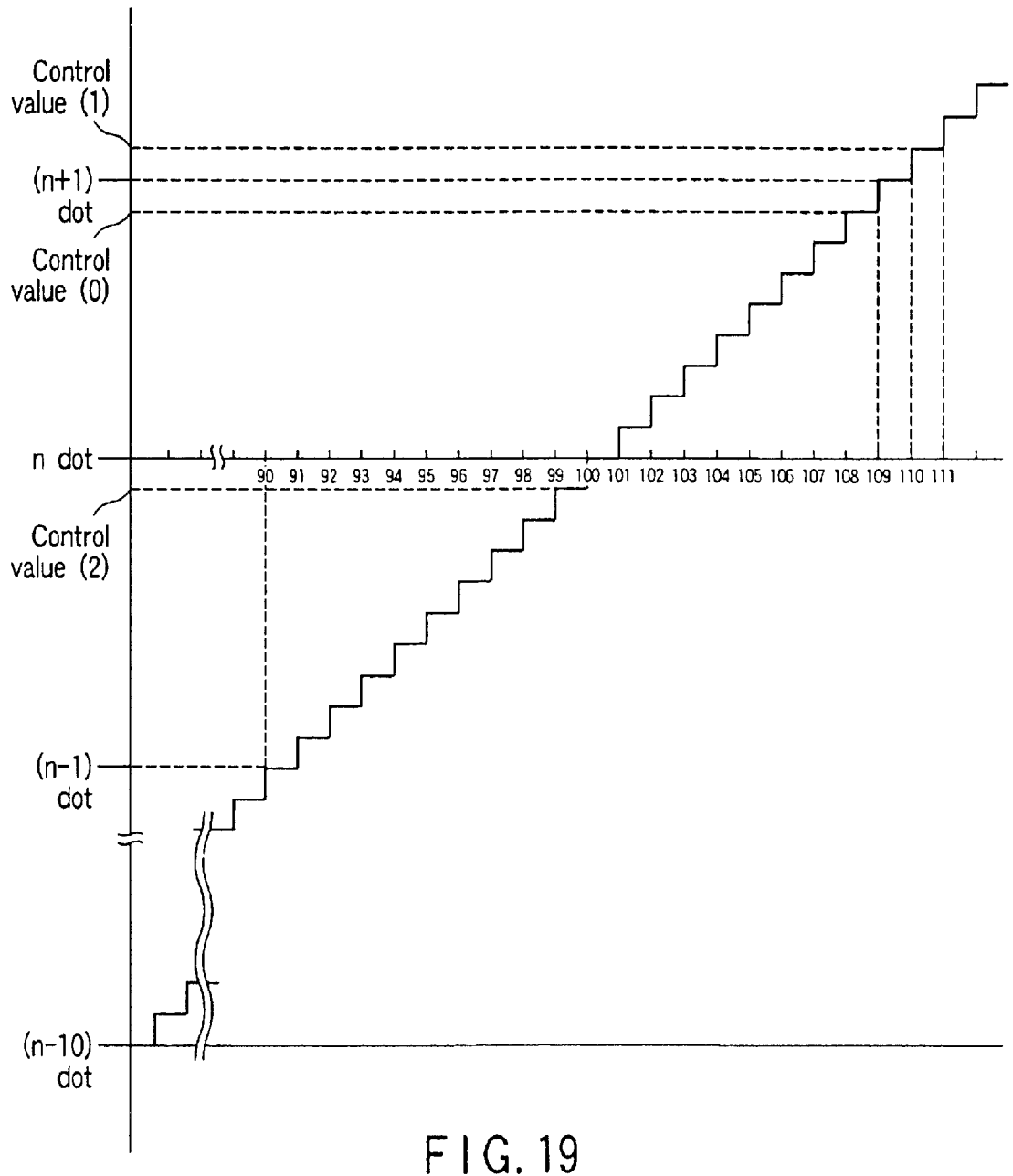
FIG. 19 is a view for illustrating a relationship between the dot and the tap according to a third embodiment of the invention.

FIG. 19 shows the relationship between the dot and the tap according to the third embodiment. The vertical axis shows the dot value and the horizontal axis shows the tap value. Even in the embodiment, the tap value corresponding to one dot is 10. It is assumed that the tap adjusting circuit (delay line 117 in FIG. 5) can adjust the tap up to 200 taps. That is to say, the light-emitting timing can be changed by 200/10=20 dots to the downstream side in the light beam scanning direction only by changing the tap value. In the invention, around the proximity of the center of the tap adjusting range is used in the main scanning control to cope with the shift of the beam passing timing. That is to say, in the case that the adjusting range of the tap is 200 taps, the beam exposure position control is performed within ±100 taps relative to 100 taps of the center.

In FIG. 19, since the tap value corresponding to one tap is 10, the position of n dots corresponds to (n−10) dots and 100 taps. The position of the control value (0) corresponds to (n−10) dots and 109 taps, the position of the control value (1) corresponds to (n−10) dots and 111 taps, and position of the control value (2) corresponds to (n−10) dots and 90 taps.

In the case that the exposure position of the light beam is changed by the change in the temperature and the control value (1) becomes the objective position of the control, only the tap is increased and the control is performed by setting the dot and the tap to (n−10) dots and 111 taps respectively. In the case that the control value (2) becomes the objective position of the control, only the tap is decreased and the control is performed by setting the dot and the tap to (n−10) dots and 90 taps, respectively, as a matter of course.

Though the change in the temperature of the delay time of one tap is small, when the carry-up/carry-down is performed, the shift of the exposure position is amplified to "the tap value corresponding to one dot×the amount of shift of one tap" at the maximum. However, according to the invention, since the carryup/carry-down is not substantially generated, the light beam scanning apparatus in which the shift in the main scanning direction is remarkably small can be provided.

Figure 20:
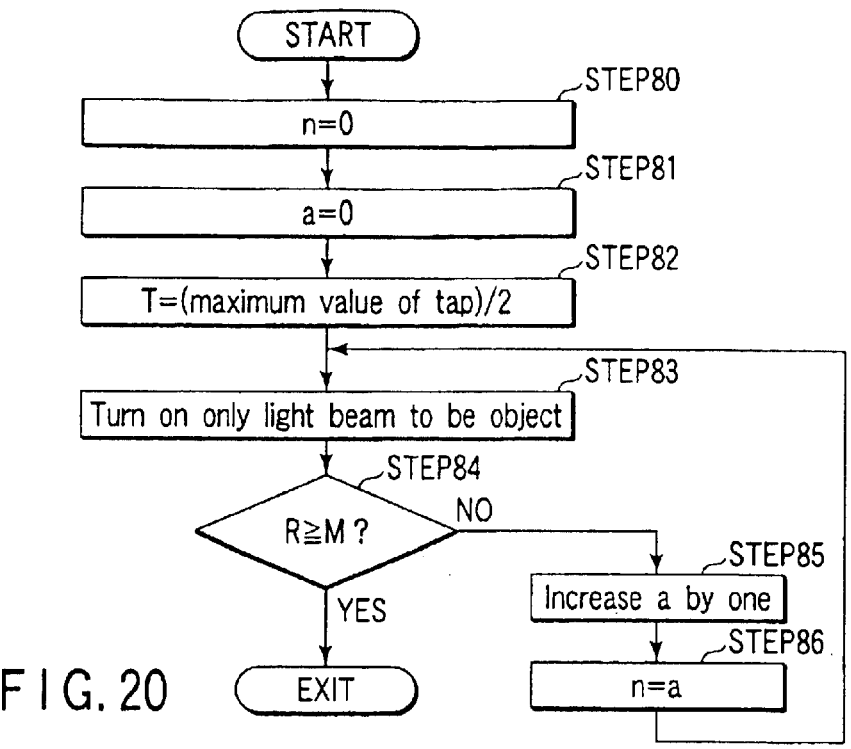
FIG. 20 is a flow chart showing the operation according to the third embodiment of the invention.

FIG. 20 is the flow chart for determining the dot value n in the center of the control range.

The CPU 51 sets the dot value n to zero (STEP 80). In this case, other numbers in which the laser beam never reaches the timing sensor SR may be used. Then, the CPU 51 sets a variable "a" to zero and sets a central value T of the number of usable taps to 100 in this case (=200/10) (STEP 81 and STEP 82). The CPU 51 turns on and scans the light beam to be the control object in STEP 83, and the CPU 51 decides whether the count value of the timing sensor SR is not smaller than the predetermined value M or not in STEP 84.

If the count value of the timing sensor SR is lower than the predetermined value M (in the case of No in STEP 84), the CPU 51 increases "a" by one, substitutes "a" for n (STEP 85 and STEP 86), and turns on and scans the light beam to be the control object (STEP 83). The dot value n in the center of the control range are determined and the dot value is fixed to the determined value n in such a manner that the CPU 51 repeats STEP 83 to STEP 86 until the count value of the timing sensor SR becomes not smaller than the predetermined value M.

Figure 21:
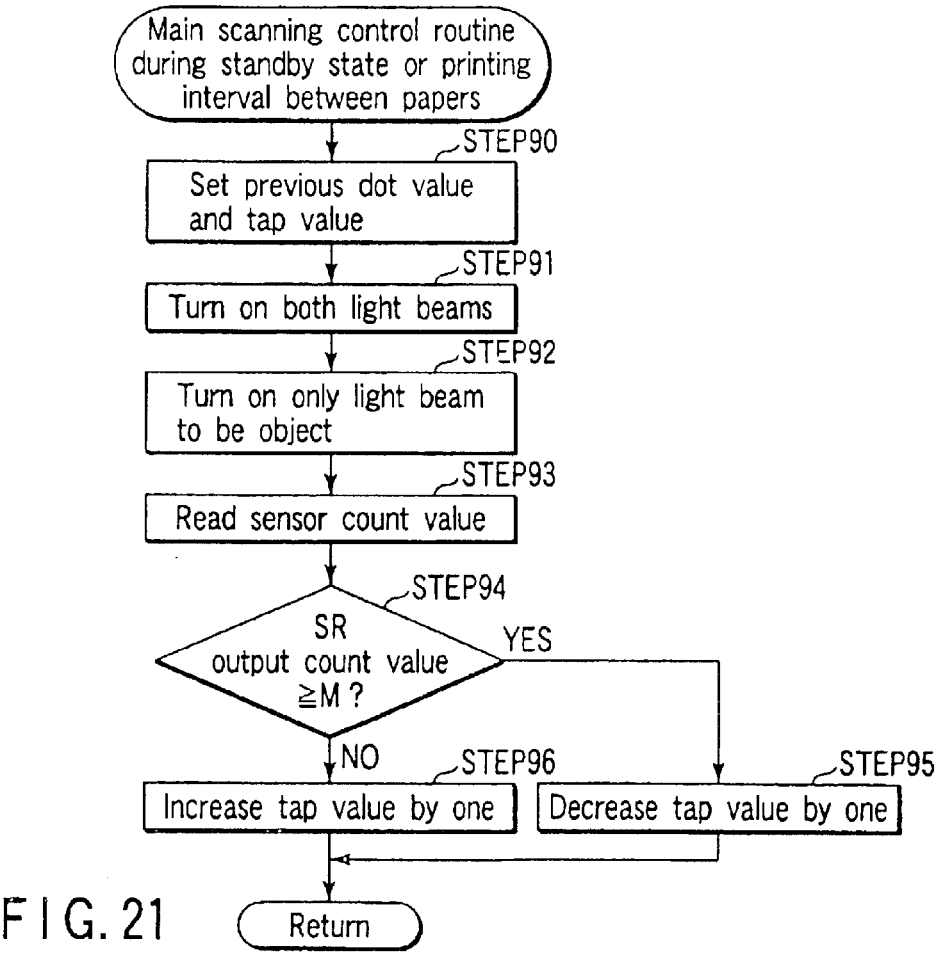
FIG. 21 is a flow chart showing a main scanning control operation during standby and control between papers according to the third embodiment of the invention.

FIG. 21 is the flow chart showing the main scanning control operation during the standby state or the printing interval between papers according to the embodiment.

Since STEP 90 to STEP 94 are the same as STEP 20 to STEP 24 in FIG. 13, the description is omitted. If the count value of the output of the timing sensor SR is not smaller than the predetermined value M (in the case of YES in STEP 44), the CPU 51 decreases the tap value by one (STEP 95). Accordingly, the CPU 51 shifts the exposure position by one tap to the upstream side in the scanning direction. If the count value of the output of the timing sensor SR is smaller than the predetermined value M (in the case of No in STEP 44), the CPU 51 increases the tap value by one (STEP 96). Accordingly, the CPU 51 shifts the exposure position by one tap to the downstream side in the scanning direction.

As described above, the image forming apparatus according to the embodiment includes the exposure position setting portion (117, 119, and 56) for setting the position of the exposure area EA exposed by the beam scanning of the scanning portion 35 as the additional value of the first setting value (dot value) which is set in the first unit (dot unit) corresponding to the scanning of the pixel clock period Pc and the second setting value (tap value) which is set in the second unit (tap unit) corresponding to the scanning of the period Δ·td smaller than the pixel clock period Pc.

The CPU 51 sets the second setting value (tap value) to the half of (a predetermined ratio to) the maximum value (200) of the second setting value (STEP 82), decides the first setting value (dot value) in which the position in the main scanning direction of the area scanned and exposed on the basis of the second setting value substantially corresponds to the objective position (STEP 85 and STEP 86), and fixes the first setting value to the decided value. Further, the CPU 51 changes the second setting value (tap value) of the exposure position setting portion according to the shift from the objective position of the exposure position EP during the standby state or the printing interval between papers and corrects the shift (STEP 95 and STEP 96).

According to the embodiment, since the carry-up/carry-down of the dot and the tap is not substantially generated, the beam position error in the main scanning direction can be decreased as small as possible.

What is claimed is:

1. An image forming apparatus comprising:

a photosensitive member;

a beam generating means for generating a light beam;

a scanner which reflects the light beam generated from the beam generating means toward the photosensitive member and exposes the photosensitive member by scanning the photosensitive member in a main scanning direction with the light beam;

an exposure position setting means for setting a position of an exposure area by beam scanning of the scanner as an additional value of a first setting value which is set in a first unit corresponding to the scanning of a pixel clock period and a second setting value which is set in a second unit corresponding to the scanning of the period smaller than the pixel clock period;

a first control means for controlling the beam generating means and the scanner so as to expose the area set by the exposure position setting means;

a sensor which detects a position in the main scanning direction of the area exposed by the first control means;

a second control means for controlling the exposure position setting means so that the exposure position detected by the sensor becomes an objective position, the second control means having a means for increasing the first setting value by one unit and changing the second setting value to a first predetermined value in the case that the additional value of the exposure position setting means is increased to reach a first threshold, and a means for decreasing the first setting value by one unit and changing the second setting value to a second predetermined value in the case that the additional value of the exposure position setting means in which the first setting value has been increased by one unit is decreased to reach a second threshold smaller than the first threshold, wherein the second threshold is separated from the first threshold by a distance corresponding to a value in which the first predetermined value is added to the value of the second unit corresponding to the scanning of the pixel clock period;

a means for determining an image forming area on the photosensitive member on the basis of the first setting value and the second setting value of the exposure position setting means and forming an electrostatic latent image corresponding to input image data on the image forming aria using the beam generating means; and a developer which develops the latent image formed on the photosensitive member with developing agent.

2. An image forming apparatus comprising:

a photosensitive member;

a beam generating means for generating a light beam;

a scanner which reflects the light beam generated from the beam generating means toward the photosensitive member and exposes the photosensitive member by scanning the photosensitive member in a main scanning direction with the light beam;

an exposure position setting means for setting a position of an exposure area by beam scanning of the scanner as an additional value of a first setting value which is set in a first unit corresponding to the scanning of a pixel clock period and a second setting value which is set in a second unit corresponding to the scanning of the period smaller than the pixel clock period;

a first control means for controlling the beam generating means and the scanner so as to expose the area set by the exposure position setting means;

a sensor which detects a position in the main scanning direction of the area exposed by the first control portion;

a second control means for controlling the exposure position setting means so that the exposure position detected by the sensor becomes an objective position, the second control means having a means for changing the second setting value to a value in which a multiple value of the second unit corresponding to the scanning of the pixel clock period is multiplied by a multiple of a predetermined number of the first unit in the case that the second setting value is increased to a value more than the value corresponding to the multiple of the predetermined number of the first unit;

a means for determining an image forming area on the photosensitive member on the basis of the first setting value and the second setting value of the exposure position setting means and forming an electrostatic latent image corresponding to input image data on the image forming area using the beam generating means; and a developer which develops the latent image formed on the photosensitive member with developing agent.

3. An image forming apparatus comprising:

a photosensitive member;

a beam generating means for generating a light beam;

a scanner which reflects the light beam generated from the beam generating means toward the photosensitive member and exposes the photosensitive member by scanning the photosensitive member in a main scanning direction with the light beam;

an exposure position setting means for setting a position of an exposure area by beam scanning of the scanner as an additional value of a first setting value which is set in a first unit corresponding to the scanning of a pixel clock period and a second setting value which is set in a second unit corresponding to the scanning of the period smaller than the pixel clock period;

a first control means for controlling the beam generating means and the scanner so as to expose the area set by the exposure position setting means;

a sensor which detects a position in the main scanning direction of the area exposed by the first control portion;

a second control means for controlling the exposure position setting means so that the exposure position detected by the sensor becomes an objective position, the second control means having a means for setting the second setting value to a value of a predetermined ratio to the maximum value of the second setting value, deciding the first setting value in which the position in the main scanning direction of the area exposed by the first control portion substantially corresponds to the objective position, fixing the first setting value to the decided value, and changing the second setting value according to the shift of the exposure position from the objective position;

a means for determining an image forming area on the photosensitive member on the basis of the first setting value and the second setting value of the exposure position setting means and forming an electrostatic latent image corresponding to input image data on the image forming area using the beam generating means; and a developer which develops the latent image formed on the photosensitive member with developing agent.

* * * * *